United States Patent
Conner et al.

(10) Patent No.: US 9,505,991 B2
(45) Date of Patent: Nov. 29, 2016

(54) APPARATUS AND METHOD FOR PROCESSING BIOMASS

(71) Applicant: CarbonScape Limited, Marlborough (NZ)

(72) Inventors: Gregory Thomas Conner, Marlborough (NZ); Forrest John Tyrrell-Baxter, Marlborough (NZ)

(73) Assignee: Carbonscape Limited, Blenheim (NZ)

( * ) Notice: Subject to any disclaimer, the term of this patent is extended or adjusted under 35 U.S.C. 154(b) by 254 days.

(21) Appl. No.: 14/359,779

(22) PCT Filed: Nov. 21, 2012

(86) PCT No.: PCT/NZ2012/000213
§ 371 (c)(1),
(2) Date: May 21, 2014

(87) PCT Pub. No.: WO2013/077748
PCT Pub. Date: May 30, 2013

(65) Prior Publication Data
US 2015/0068113 A1    Mar. 12, 2015

(30) Foreign Application Priority Data

Nov. 21, 2011    (NZ) ........................................ 596549

(51) Int. Cl.
*C10G 32/02*    (2006.01)
*C10L 1/00*    (2006.01)
(Continued)

(52) U.S. Cl.
CPC .............. *C10G 32/02* (2013.01); *B01J 19/126* (2013.01); *C01B 31/02* (2013.01); *C01B 31/04* (2013.01);
(Continued)

(58) Field of Classification Search
CPC ......... C10G 32/02; C10G 1/04; C10L 9/086; C10L 5/44; C10L 5/442; C10L 1/00; C01B 31/02; C01B 31/04; C01B 31/086; C01B 31/088; B01J 19/126
See application file for complete search history.

(56) References Cited

U.S. PATENT DOCUMENTS 3,777,095 A    12/1973  Muranaka
4,054,423 A *  10/1977  Blenman .................. C10H 5/00
                                                     123/3

(Continued)

FOREIGN PATENT DOCUMENTS

WO    WO-2005/125059    12/2005
WO    WO-2007/007068    1/2007

(Continued)

OTHER PUBLICATIONS

Singh, R. et al. (2015). "Hydrothermal Liquefaction of Biomass," in Recent Advances in Thermochemical Conversion of Biomass, Elsevier, 504 pgs (Office action cites p. 274).*

(Continued)

*Primary Examiner* — Brian McCaig
(74) *Attorney, Agent, or Firm* — Cesari and McKenna LLP

(57) ABSTRACT

There is provided an apparatus (1) and methods for processing biomass to produce charcoal, bio-oil(s) activated carbon, recarburizer carbon, or nut coke by means of microwave energy. The apparatus has a rotatable tube (5) for receiving biomass (108), an electromagnetic generator (7). One method provides applying electromagnetic energy to the biomass (108) and an absorbing material (109). An alternative method provides allowing an indirect, black body radiation field to develop, and exposing the biomass (108) to the black body radiation field and the electromagnetic energy. Another method provides allowing plasma to form and exposing the biomass to the plasma and the electromagnetic energy. Another method provides introducing the biomass to a second container (205), introducing the second container to a first reaction container (5), applying electromagnetic energy to the biomass and an absorbing material (109), allowing a plasma to form in the first container, which heats the biomass in the second container.

10 Claims, 10 Drawing Sheets

(51) Int. Cl.
*C10L 5/44* (2006.01)
*C01B 31/02* (2006.01)
*C01B 31/04* (2006.01)
*B01J 19/12* (2006.01)
*C01B 31/08* (2006.01)
*C10G 1/04* (2006.01)
*C10L 9/08* (2006.01)

(52) U.S. Cl.
CPC ........... *C01B 31/086* (2013.01); *C01B 31/088* (2013.01); *C10G 1/04* (2013.01); *C10L 1/00* (2013.01); *C10L 5/44* (2013.01); *C10L 5/442* (2013.01); *C10L 9/086* (2013.01); *B01J 2219/0869* (2013.01); *B01J 2219/0881* (2013.01); *B01J 2219/1206* (2013.01); *C10L 2200/0469* (2013.01); *C10L 2290/36* (2013.01); *C10L 2290/38* (2013.01); *C10L 2290/40* (2013.01); *Y02E 50/14* (2013.01); *Y02E 50/30* (2013.01); *Y02P 20/145* (2015.11)

(56) References Cited

U.S. PATENT DOCUMENTS

| | | | |
|---|---|---|---|
| 4,118,282 A | 10/1978 | Wallace | |
| 5,728,271 A * | 3/1998 | Piskorz | B01J 8/1836 201/25 |
| 2008/0256845 A1* | 10/2008 | Meikrantz | B04B 5/10 44/308 |
| 2009/0183430 A1* | 7/2009 | Schubert | C10J 3/04 48/85 |
| 2011/0219679 A1 | 9/2011 | Budarin et al. | |
| 2013/0032464 A1* | 2/2013 | Kasin | C10K 3/02 201/19 |

FOREIGN PATENT DOCUMENTS

| | | |
|---|---|---|
| WO | WO-2007/128800 | 11/2007 |
| WO | WO-2009-090072 A1 | 7/2009 |
| WO | WO-2011/107789 | 9/2011 |

OTHER PUBLICATIONS

Prakash, A. et al. (2015). "Thermochemical Valorization of Lignin," in Recent Advances in Thermochemical Conversion of Biomass, Elsevier, 504 pgs (Office action cites p. 469).*

Stephanidis et al "Catalytic Upgrading of Lignocellulosic Biomass Pyrolysis Vapours: Effect of Hydrothermal Pre-Treatment of Biomass" Catalysis Today vol. 167, pp. 37-45. 2011.

* cited by examiner

APPARATUS AND METHOD FOR PROCESSING BIOMASS

CROSS REFERENCE TO RELATED APPLICATIONS

This application is the National Stage of International Application No. PCT/NZ2012/000213, filed on Nov. 21, 2012, which claims the benefit of New Zealand Application No. 596549 filed on Nov. 21, 2011. The contents of both applications are hereby incorporated by reference in their entirety.

FIELD OF THE INVENTION

The present invention relates to an apparatus and method for processing biomass. In particular, the present invention relates to an apparatus and method for making charcoal, bio-oil(s) activated carbon, recarburiser carbon, or nut coke from biomass by means of microwave energy.

BACKGROUND

There is considerable concern over the current volume of greenhouse gas emissions and the effect that these may have on the global climate. Carbon dioxide ($CO_2$) is the principal greenhouse gas believed to be driving anthropogenic climate change and represents around 70% of all greenhouse gases generated globally.

To achieve lasting reductions in carbon dioxide, wide scale changes in the world's patterns of energy consumption will be needed. For example, use of renewable energy will need to be promoted, as well as increased energy efficiency and the development of fuel alternatives. One alternative fuel is biofuel.

Biofuels or bio-oil(s) are renewable resources and their use has significantly fewer net emissions of greenhouse gases than fossil fuels when burned. Biofuels or bio-oil(s) can be used as an alternative to fossil fuels in vehicles, heating and the generation of electricity.

Another way to reduce carbon dioxide in the atmosphere is to capture and store some of the atmospheric carbon dioxide. The capture of carbon gases for storage is referred to as "sequestration". Sequestration of carbon in gaseous form (as the gas is released, for example at power plants) is a technically complex and high cost solution. An alternative approach is to sequester carbon dioxide in trees by reforesting areas of land. On average between 40-50% of all material in trees is carbon. Importantly, reforestation requires large areas of land to store significant amounts of carbon dioxide. In addition, the carbon dioxide that is stored in trees can only be held if the area remains forested If the area is cleared, much of the carbon dioxide returns to the atmosphere.

A method of sequestering carbon dioxide is described in PCT specification WO2008/079029.

Activated Carbon:

Activated Carbon is a charcoal product that has a micropore structure that exhibits a significant specific internal surface area. Activated carbon has many uses, mainly involving the adsorption of unwanted materials, thus in the sugar industry it is used to remove the dark brown colour so that white sugar can be made. However it could also be of significant value in the removal of pollution, particularly if it is suitable for adsorbing larger molecules.

A further possible use for activated carbon is through the absorption of nitrogen containing species, such as urea, then applying the product to agricultural land. Activated carbon does not retain these species strongly, and hence would act as a slower-release agent for nitrogenous fertilizer while placing fixed carbon in the ground and thus, provided the carbon came from biomass, assisting the reduction of carbon dioxide from the atmosphere. Activated carbon can also absorb methane and hence act as a possible assistant in inhibiting methane emissions from certain stock. In short, it has significant potential further uses, and hence additional methods for its manufacture should be welcome in the market.

The manufacture of activated carbon is well-known. Carbon containing species are usually carbonized at about 600° C., then, when this is complete, it is activated, usually by oxidation, e.g. with steam or air, or by treating it with chemical methods, such as zinc chloride, phosphoric acid, or any number of other chemicals. Activation is usually carried out somewhere between 800° C. to 1200° C., under quite carefully controlled conditions. Generally speaking, the heat is provided externally to the carbonaceous material, which is usually in a rotating kiln of some description.

In such a kiln, there are two sources of heating for the biomass: conduction through direct contact with the walls, and black body type radiation from the walls. Biomass has a poor thermal conductivity and as the mass reaches approximately 300° C. it begins to degrade endothermically. Some of the products of such thermal degradation are highly viscous tars that flow into pores of the biomass, which is undesirable for the formation of activated carbon as by filling pores it tends to reduce the end surface area.

The carbonization is slow because as the biomass approaches about 300° C., it begins to degrade and produce degradation products. The degradation products are often liquid tars, which can flow. Anything that fills in developing pores of the carbon is undesirable.

The surface area of Activated Carbon is usually determined by low pressure Nitrogen adsorption (B.E.T method). Since this adsorption is generally attributed to a monolayer, the surface area can be calculated. The surface area of one gram of activated carbon is typically about 500 $m^2$ and ranges from about 200 $m^2$ to about 2500 $m^2$.

Recarburiser Carbon:

Carbon is the most important component added to commercial steel comprising 0.15-1.5% of the mass of finished metal product. The carbon content of steel influences specific mechanical properties such as hardness, strength and thermal properties such as melting point and 'weldability'.

During the process of steel production, it is common practice for most foundries to combine some steel scrap with primary iron concentrate in the metallic charge. The percentage of steel scrap used is a function of price, availability, alloy level and other economic factors.

The quantity of carbon introduced into the smelter by the charge materials (i.e. steel scrap and iron returns) is usually lower than the value targeted in the finished steel product, which is usually within the range of 3.0 to 4.0% C. Therefore, carbon units termed "recarburisers" are added to the batch to increase the level of elemental carbon in steel products to the specified level.

During the smelting stage of the manufacturing process, recarburisers are mixed into the molten steel bath, allowing elemental carbon to be absorbed and distributed homogeneously throughout the metallic charge.

Recarburisers for commercial steel production require a content that has a high proportion of fixed carbon, high calorific value. Crucially, recarburiser material must have a low volatile, nitrogen and sulphur contents to ensure safe, efficient progression of reduction-oxygen reactions and to minimise harmful emissions.

Additionally it is desirable that recarburisers are highly porous to provide maximum surface area contact with the molten steel batch to facilitate efficient uptake of elemental carbon.

It is common for recarburisers to be derived from high-grade bituminous or anthracite coals and premium versions being synthesised from petroleum products. Some foundry's use steel billets that have been specially manufactured with a specific carbon content and use as a recarburiser in the metallic charge.

Nut Coke:

Coke is used as a fuel and as a reducing agent in smelting iron ore in a blast furnace. Since smoke-producing constituents are driven off during the coking of coal or biomass, coke forms a desirable carbon fuel for furnaces in which conditions are not suitable for the complete burning of bituminous coal or biomass itself. Coke may be burned with little or no smoke under combustion conditions, while bituminous coal would produce significant amounts of smoke.

Nut Coke is characterised by a much larger particle size (typically 25 mm×55 mm) compared to other fuel cokes, such as injection coke or pea coke, which are typically smaller than 10×10 mm. Unlike recarburiser used to increase the level of carbon in a molten charge of steel, nut coke can contain up to twice the allowable mineral content and five times the moisture content. This aspect allows for a wider range of woody biomass feedstocks to be considered for nut coke production.

Low volatile matter content in coke is of critical importance to facilitate safe, stable energy release and to minimise the risk of explosive release during combustion. Low Sulphur and Nitrogen contents are also required to minimise the formation sulphur dioxide and NOX during the combustion process.

In this specification where reference has been made to patent specifications, other external documents, or other sources of information, this is generally for the purpose of providing a context for discussing the features of the invention. Unless specifically stated otherwise, reference to such external documents or such sources of information is not to be construed as an admission that such documents or such sources of information, in any jurisdiction, are prior art or form part of the common general knowledge in the art.

It is an object of at least preferred embodiments of the present invention to provide an apparatus and/or method for processing biomass or biomass to produce charcoal, bio-oil(s), activated carbon recarburiser carbon, and/or nut coke that overcomes one or more of the drawbacks of known methods for converting biomass to activated carbon and recarburiser carbon, and/or to at least provide the public with a useful choice.

SUMMARY OF THE INVENTION

In a first aspect, the invention broadly consists in an apparatus for processing biomass, the apparatus comprising:
a rotatable tube having an inlet for receiving unprocessed biomass, an outlet for discharging processed biomass, the rotatable tube being inclined at an angle relative to a horizontal axis
a metallic housing for housing the rotatable tube;
an electromagnetic generator associated with the rotatable tube for applying electromagnetic energy to the rotatable tube and the biomass received therein;
a waveguide associated with the electromagnetic generator for introducing electromagnetic energy to the rotatable tube;
wherein the waveguide is adapted such that the electromagnetic energy introduced by the waveguide into and through the rotatable tube will travel in a direction generally parallel to the longitudinal axis of the rotatable tube.

The apparatus may be used in a method that applies electromagnetic energy to an biomass to produce charcoal(s), bio-oil(s), and/or gas(es).

In an embodiment, the angle of the rotatable tube relative to the horizontal axis is adjustable.

In an embodiment, the apparatus further comprises insulation surrounding the rotatable tube.

In an embodiment, the rotatable tube is substantially pressure sealable.

In an embodiment, the rotatable tube is substantially microwave sealable.

In an embodiment, the apparatus further comprises a pressure regulator associated with the rotatable tube for providing a source of pressure to the interior of the rotatable tube. The pressure within the rotatable tube may be positive or negative relative to atmospheric pressure.

In an embodiment, the apparatus further comprises a gas/vapour extraction system. The gas/vapour extraction system comprises a source of carrier gas. The source of carrier gas may be associated with the rotatable tube for providing the interior of the rotatable tube with a carrier gas. The source of carrier gas may be a pressurised container. The carrier gas may be an inert gas and may comprise carbon dioxide, argon, or nitrogen, for example.

In an embodiment, the gas/vapour extraction system further comprises a gas condenser suitable for condensing the bio-oil(s) emitted in vapour form into condensate. In an embodiment, the condensate is collected in a suitable container associated with the gas condenser.

In an embodiment, the gas/vapour extraction system further comprises a vacuum generator for providing a source of reduced pressure to the gas condenser. In an embodiment, the pressure regulator associated with the rotatable tube for increasing the air pressure within the rotatable tube space is also the vacuum generator for providing a source of reduced pressure to the gas condenser.

In an embodiment, the apparatus has an inlet or gland to introduce a liquid into the interior of the rotatable tube. The liquid is preferably water introduced as a spray.

In an embodiment, the electromagnetic generator is a microwave generator that generates microwave radiation.

In an embodiment, the microwave radiation has a frequency range of about 900 MHz to about 3 GHz. Typical frequencies of the electromagnetic energy used are between about 900 MHz and about 1000 MHz, and between about 2 GHz and about 3 GHz. The frequency of the microwave radiation may suitably be one of the industrial, scientific and medical (ISM) bands for industrial heating. The ISM bands for industrial heating include about 915 MHz, about 922 MHz, and about 2450 MHz. Other frequencies that may also be suitable include about 13 MHz, about 27 MHz and about 40 MHz, for example.

In an embodiment, the waveguide has a first portion extending from the microwave generator and a second portion extending towards the rotatable tube. In an embodiment, the second portion extends away from the first portion at an angle relative to the first portion. The second portion suitably extends at an angle that corresponds to the angle of the rotatable tube. The angle of the second portion relative to the first portion is suitably adjustable corresponding to the adjustment of the rotatable tube relative to the horizontal axis.

In one embodiment, the waveguide comprises a hollow component. The waveguide may comprise a hollow metallic component. In an alternative embodiment, the waveguide may comprise a solid component.

In an embodiment, the waveguide further comprises an impedance matching tuner.

In an embodiment, the apparatus further comprises a chipper for chipping the biomass. In an embodiment, the biomass is chipped before it is received by the rotatable tube. The chipper may be connected to the other components of the apparatus. Alternatively, the chipper may be a separate stand alone component of the apparatus.

In an embodiment, the apparatus further comprises a feeding mechanism or an infeed hopper for feeding the biomass to the rotatable tube.

In an embodiment, the apparatus further comprises a sensor for measuring the oxygen content within the rotatable tube.

In an embodiment, the apparatus further comprises a control system. The control system suitably receives information from the temperature probe, vacuum probe and oxygen sensor. The control system suitably uses that information to control the inputs of the process including: the power of the microwave generator, the rotation rate of rotary tube, the angle of the rotary tube, the feed rate of biomass from the infeed hopper, the pressure produced by the vacuum generator, and/or the rated supply of the carrier gas, to maintain the temperature and pressure in the rotatable tube within predetermined operating range(s).

In an embodiment, one or more of the components of the apparatus may be powered by a renewable energy source. In an embodiment, the renewable energy source is a solar power energy source. Alternative renewal energy sources that may be suitable include wind power, hydroelectricity, geothermal heat, tidal flows, biomass, or biofuels (including oils and gases generated by the apparatus and method of the present invention), for example.

In an embodiment, the biomass is plant material.

In a second aspect, the invention broadly consists in a method for processing biomass, the method comprising:
(a) providing biomass;
(b) providing a rotatable tube having an inlet for receiving unprocessed biomass, an outlet for discharging processed biomass, the rotatable tube being inclined at an angle relative to a horizontal axis,
(c) applying electromagnetic energy to the rotatable tube and the biomass received therein such that the electromagnetic energy travels in a direction generally parallel to the longitudinal axis of the rotatable tube.

In an embodiment, the method comprises applying electromagnetic energy to an biomass to produce charcoal(s), bio-oil(s), and/or gas(es). In an embodiment, the biomass is plant material.

In an embodiment, the method further comprises the step of adjusting angle of the rotatable tube relative to the horizontal axis.

In an embodiment, the step of providing a rotatable tube comprises providing a rotatable tube with insulation surrounding the rotatable tube.

In an embodiment, the step of applying electromagnetic energy comprises applying microwave radiation. In an embodiment, the microwave radiation has a frequency range of about 900 MHz to about 3 GHz. Typical frequencies of the electromagnetic energy used are between about 900 MHz and about 1000 MHz, and between about 2 GHz and about 3 GHz. The frequency of the microwave radiation may suitably be one of the industrial, scientific and medical (ISM) bands for industrial heating. The ISM bands for industrial heating include about 915 MHz, about 922 MHz, and about 2450 MHz. Other frequencies that may also be suitable include about 13 MHz, about 27 MHz and about 40 MHz, for example.

In an embodiment, the method further comprises adjusting the pressure of the interior of the rotatable tube. The pressure within the rotatable tube may be positive or negative relative to atmospheric pressure. In an embodiment, the biomass is processed at a pressure of about 0 kPa to about 200 kPa.

In an embodiment, the method further comprises introducing a liquid into the interior of the rotatable tube. The liquid is preferably water, which is introduced as a spray.

In an embodiment, the method further comprises collecting vapour emitted from the organic matter. In an embodiment, the method further comprises condensing the vapour into a condensate. In an embodiment, the method further comprises collecting the condensate. The condensate is suitably collected in a container. In an embodiment, the condensate comprises bio-oils.

In an embodiment, the method further comprises providing a gas/vapour extraction system. In an embodiment, the method further comprises providing the interior of the rotatable tube with a carrier gas. The carrier gas may be an inert gas and may comprise carbon dioxide, argon, or nitrogen, for example.

In an embodiment, the method further comprises reducing the pressure of the gas condenser. In an embodiment, the pressure regulator associated with the rotatable tube for increasing the air pressure within the rotatable tube space is also the vacuum generator for providing a source of reduced pressure to the gas condenser.

In an embodiment, the method further comprises chipping the biomass.

In an embodiment, the method further comprises measuring the temperature of the material in the rotatable tube.

In an embodiment, the method further comprises measuring the pressure within the rotatable tube.

In an embodiment, the method further comprises measuring the oxygen content within the rotatable tube.

In an embodiment, the method further comprises receiving information from the temperature probe, vacuum probe and oxygen sensor. The method suitably comprises using that information to control the inputs of the process including: controlling the power of the microwave generator, controlling the rotation rate of rotary tube, controlling the angle of the rotary tube, controlling the feed rate of biomass from the infeed hopper, controlling the pressure produced by the vacuum generator, and/or controlling the rated supply of the carrier gas, to maintain the temperature and pressure in the rotatable tube within predetermined operating range(s).

In a third aspect, the invention broadly consists in a waveguide for guiding electromagnetic energy from an electromagnetic generator to a chamber, the waveguide comprising:
  a first portion adapted to receive electromagnetic energy from an electromagnetic generator; and
  a second portion adapted to receive electromagnetic energy from the first portion and guide the electromagnetic energy to the chamber;
wherein the second portion is operatively connected to the first portion such that the angle of the second portion relative to the first portion is adjustable.

In an embodiment, the second portion of the wave guide is operatively connected to the first portion of the waveguide by a connecting portion that allows the first and seconds portions of the waveguide to pivot relative to each other.

In one embodiment, the portions of the waveguide comprise hollow components. The portions of the waveguide may comprise hollow metallic components. In an alternative embodiment, the portions of the waveguide may comprise solid components.

In an embodiment, the waveguide further comprises an impedance matching tuner.

In a fourth aspect, the invention broadly consists a method of producing bio-oil(s) from biomass comprising:
(a) providing biomass;
(b) providing an electromagnetic cavitychamber defining a reactor space for receiving the biomass;
(c) delivering the biomass into the reactor space so that the biomass travels generally in a first direction;
(d) applying electromagnetic energy to the reactor space and the biomass received therein so that bio-oil(s) are emitted from the biomass in vapour form;
(e) supplying an inert carrier gas to the reactor space so that the inert gas travels in a direction generally opposite to the first direction to displace and carry the bio-oil(s) away from the container; and
(f) collecting the bio-oil(s).

The bio-oil(s) emitted from the biomass comprises a liquid(s) known as tar(s).

In an embodiment, the bio-oil(s) comprise volatile bio-oil(s). Additionally, or alternatively, the bio-oil(s) comprise non-volatile bio-oil(s). The volatile bio-oil(s) are bio-oil(s) with a significant vapour pressure at their temperature of formation. The non-volatile bio-oil(s) are bio-oil(s) that exert limited vapour pressure at the temperature of formation.

In an embodiment, the method further comprises introducing a liquid into the interior of the rotatable tube. The liquid is preferably water, which is introduced as a spray.

In an embodiment, the process also produces charcoal from the biomass by coupling or transmitting electromagnetic energy into the biomass. The charcoal is also known as biochar or agrichar.

In an embodiment, the biomass is plant material. The plant material may include, but is not limited to wood, cereal plants, seaweed, organic waste or any biomass capable of being converted to charcoal. In an embodiment, the plant material is *radiata* pine, coal, rape seed, corn stover, coffee grains, vine clippings, cedar, bamboo, sandalwood or eucalyptus.

The inert gas may comprise carbon dioxide, argon, or nitrogen, for example.

In an embodiment, the step of collecting bio-oil(s) may comprise the step of passing the carrier gas carrying the bio-oil(s) vapour(s) through a condenser to produce a condensate of bio-oil(s).

In an embodiment, the carrier gas is supplied to the chamber at a specified flow rate. The flow rate may be specified to control the pressure within the chamber and/or the rate of removal of bio-oil.

In an embodiment, the method further comprises the step of controlling the temperature of the biomass during the step of applying electromagnetic energy to the reactor space and the biomass received therein. The temperature may be controlled by controlling the power of the electromagnetic generator and/or controlling the duration of time that the electromagnetic energy is applied to the reactor space and the biomass received therein.

In an embodiment, the biomass is processed at a pressure of about 0 kPa to about 200 kPa.

In an embodiment, the step of applying electromagnetic energy to the biomass heats the biomass to a temperature of about 30° C. to about 1000° C.

In an embodiment, the biomass enters the quartz tube at about ambient temperature.

In an embodiment, the biomass exits at a temperature not greater than about 330° C., if the objective is to collect essential oils.

In an embodiment, the biomass exits at a temperature between about 350° C. and about 420° C., if the objective is to collect saccharide pyrolysis products.

In an embodiment, the biomass exits at a temperature greater than about 600° C. if the objective is to make charcoal.

More preferably, the electromagnetic energy is applied in a second direction that is substantially parallel with the first direction. The second direction may be the opposite direction to the first direction.

In an embodiment, the chamber is insulated.

In an embodiment, the chamber is inclined at and angle relative to a horizontal axis and the method further comprises adjusting the angle of the chamber relative to the horizontal axis.

In an embodiment, the electromagnetic energy comprises microwave energy. The microwave radiation preferably has a frequency range similar to the range disclosed in relation to the first aspect above.

In an embodiment, the method of producing bio-oil(s) from an biomass is carried out using the apparatus of the first aspect described above.

In a fifth aspect, the invention broadly consists in bio-oil(s) when produced by the method of the second aspect described above.

In a sixth aspect, the invention broadly consists in a bio-oil(s) produced by applying electromagnetic energy to an biomass, wherein the bio-oil(s) is characterised by an energy content of at least about 20 to 50 MJ/kg.

In an embodiment, the electromagnetic energy comprises microwave energy. The microwave radiation preferably has a frequency range similar to the range disclosed in relation to the first aspect above.

In an embodiment, the biomass is plant material. Alternatively, the biomass may be any biomass capable of being converted to charcoal. The plant material may include wood, cereal plants, seaweed, or organic waste. In a preferred embodiment, the plant material is *Pinus Radiata*.

In a seventh aspect, the invention broadly consists in a method for processing biomass comprising the steps of:
  a) providing biomass;
  b) providing a electromagnetic cavity, the electromagnetic cavity being adapted to enclose and contain a field of electromagnetic energy;
  c) introducing the biomass to the electromagnetic cavity;
  d) applying electromagnetic energy to the electromagnetic cavity, and the biomass received therein at power levels such that the biomass receives direct electromagnetic energy and an indirect, black body radiation field is produced; and
  e) exposing the biomass to the indirect, black body radiation field while simultaneously applying the direct electromagnetic energy such that activated carbon is formed from the biomass.

In an embodiment, the method further comprises providing a reaction container, the reaction container being adapted to contain the biomass; and introducing the reaction container to the electromagnetic cavity. In this embodiment, the biomass is introduced to the reaction container.

In an embodiment, the electromagnetic cavity comprises refractory materials. The refractory materials at least partially surround the reaction chamber. In an embodiment, the refractory material surrounds the reaction chamber.

In an embodiment, the reaction container is adapted to contain the plasma.

In an embodiment, the reaction container is adapted to contain chemical reaction products produced as a result of exposing the biomass to the radiation field.

In an embodiment, the direct electromagnetic energy is applied to the biomass at power levels such that as pyrolysis products form, the pyrolysis products form a layer on the interior of the reaction container. When the direct electromagnetic energy is applied to the layer of pyrolysis products, the layer becomes an electrically conductive layer which absorbs electromagnetic energy and provides a black body radiation field. In an alternative embodiment, the method comprises applying a layer of carbon to the walls of the reaction container. For example, by painting or spraying a layer comprising graphite onto the walls of the reaction container.

In an embodiment, the biomass is exposed to these energy fields for a period of time such that a maximum yield of activated carbon is formed, the time depending on the ratio of power levels to the mass of carbon-containing material.

In an embodiment, the power levels are chosen such that the temperature of the charcoal is raised to suitable temperatures.

In an embodiment, the method further comprises ceasing exposing the biomass to the microwave energy, whereupon it is removed from the apparatus and collected.

In an embodiment, the method further comprises replacing the air within the reaction container with an added gas.

In an embodiment, when electromagnetic energy is applied to the biomass, a plasma forms in addition to any electrically conducting layer on the walls of the reaction container and this plasma provides a radiation field to the biomass.

The plasma forms through the pyrolysis products in the form of vapours, particularly those of phenolic origin, absorbing sufficient microwave energy to ionize the vapours, following which the gas phase becomes electrically conductive. The onset of electrically conductive species greatly enhances the further absorption of microwave energy, further enhancing plasma generation.

In an embodiment, the added gas flows across the biomass and is removed through an exit tube, at the same time removing volatiles that are produced as a result of applying electromagnetic energy to the biomass.

In an embodiment, the added gas is supplied to the chamber at a specified flow rate. The flow rate may be specified to control the pressure within the chamber as well as the rate of removal of bio-oil as opposed to the deposition of pyrolytic carbon on the walls of the reaction container.

In an embodiment, the method further comprises condensing bio-oil(s) emitted from the biomass as a result of applying electromagnetic energy to the biomass in vapour form into condensate. In an embodiment, the condensate is collected in a suitable container associated with a gas condenser.

In an embodiment, the method further comprises collecting non-condensable gases emitted from the biomass as a result of applying electromagnetic energy to the biomass. In an embodiment, the non-condensable gases are collected in a suitable container. In a further embodiment, steam may be introduced into the added gas.

In an embodiment, the biomass is size-reduced biomass. In a preferred embodiment, the biomass comprises finely divided lignocellulose. One of many examples of such finely divided lignocellulose is sawdust. Further examples include, but are not limited to, wood, cereal plants, seaweed or organic waste, milled agricultural waste, such as straw, the cellulosic fraction from municipal waste, the milled wastes from forestry or agricultural processing, crops grown specifically for such processing, and various scrubby plants, particularly those grown adventitiously on otherwise unused land.

In an embodiment, the direct electromagnetic energy is a longer wave electromagnetic energy. In a preferred embodiment, the longer wavelength electromagnetic energy is microwave energy. In an embodiment, the microwave energy has a frequency range of about 900 MHz to about 3 GHz. Typical frequencies of the electromagnetic energy used are between about 900 MHz and about 1000 MHz, and between about 2 GHz and about 3 GHz. In a preferred embodiment, the frequency of the microwave energy may be one of the industrial, scientific and medical (ISM) bands for industrial heating. The ISM bands for industrial heating include about 896 MHz, 915 MHz, about 922 MHz, and about 2450 MHz. Other frequencies that may also be suitable include about 13 MHz, about 27 MHz, about 40 MHz and about 5 GHz, for example.

The temperature of the activated carbon formation is between 450° C. to 1300° C., preferably between 550° C. to 900° C., the temperature being controlled through the applied power.

The heating of the biomass involves both direct absorption of microwave power, and also indirect power, from black body radiation. The black body radiation results from either applying microwave energy to an electrically conductive carbonaceous deposit on the interior of the reaction container that is red-hot to yellow hot, or from a plasma formed by the microwave energy, or from both. In an embodiment this indirect black body radiation is at continuously stable power levels.

The heating time is dependent on the power to mass of carbon-containing material, which can be between about 1 minute to about 5 hours, but is preferably between about 10 minutes and about 1 hour.

The interior of the electromagnetic cavity may be pressurized, or evacuated however it is preferred to employ approximately atmospheric pressure.

The interior of the reaction container may be pressurized, or evacuated however it is preferred to employ approximately atmospheric pressure.

In an embodiment, the method further comprises introducing an added gas to the interior of the reaction container.

The added gas is preferably any gas that does not react significantly with carbon under the conditions, or that reacts only slowly at elevated temperatures. Examples of such inert gases include, but are not restricted to, nitrogen, argon, neon and helium. Examples of mildly reactive gases include carbon dioxide, carbon monoxide and ozone.

In an embodiment, the method further comprises a pretreating step the biomass before step (a), the pretreating step comprising heating the biomass in water at a pressure of between 25 and 170 Bar for about 30 minutes to 2 hours and temperature of between about 230° C. and about 350° C.

In an embodiment, the an acid catalyst is added to the water before the pretreating step.

In an embodiment, the method further comprises mechanically pressing the pre-treated biomass to remove free water.

In an eighth aspect, the invention consists in activated carbon produced by the method of the seventh aspect.

In a ninth aspect, the invention broadly consists in a method for processing biomass comprising the steps of
- a) providing biomass;
- b) providing a microwave absorbing material;
- c) providing an electromagnetic cavity, the electromagnetic cavity being adapted to enclose and contain a field of electromagnetic energy;
- d) providing a reaction container; the reaction container being adapted to enclose solids, liquids and gases;
- e) introducing a reaction container to the electromagnetic cavity;
- f) introducing the biomass to the reaction container;
- g) introducing the microwave absorbing material to the reaction container;
- h) introducing an added gas to the interior of the reaction container;
- i) applying electromagnetic energy to the electromagnetic cavity, reaction container and the microwave absorbing material received therein at power levels such that the microwave absorbing material receives direct electromagnetic energy;
- j) allowing heat to flow from the microwave absorbing material to the added gas such that a plasma is produced by the added gas, the plasma providing a radiation field; and
- k) exposing the biomass to the radiation field such that activated carbon and/or recarburiser carbon is formed from the biomass.

In an embodiment, the method further comprises providing a reaction container, the reaction container being adapted to contain the biomass; and introducing the reaction container to the electromagnetic cavity. In this embodiment, the biomass is introduced to the reaction container.

In an embodiment, the electromagnetic cavity comprises refractory materials. The refractory materials at least partially surround the reaction chamber. In an embodiment, the refractory material surrounds the reaction chamber.

In an embodiment, the reaction container is adapted to contain the plasma.

in an embodiment, the reaction container is adapted to contain chemical reaction products produced as a result of exposing the biomass to the radiation field.

In an embodiment, the biomass may be exposed to the electromagnetic energy so that the biomass absorbs electromagnetic energy not absorbed by the microwave absorbing material.

In an alternative embodiment, the biomass is so that the biomass does not absorb electromagnetic energy not absorbed by the microwave absorbing material. The biomass may be contained in a second reaction container and not exposed to the electromagnetic energy. In this alternative embodiment, pyrolysis products generated by the biomass in the second reaction container do not form an electrically conductive layer on the walls of the first reaction container (as described in the seventh aspect of the invention) and absorbing energy from the electromagnetic field, which allows more power for the plasma.

In an embodiment, after step h) the microwave absorbing material is shielded from the electromagnetic field after initiation of plasma to allow more power for the plasma.

In an embodiment, after step h) the power levels of the electromagnetic energy are controlled and/or flow rate of the added gas to control the location and intensity of the plasma.

In an embodiment, after step h) the composition of the added gas is adjusted to control the properties and rate of chemical reaction with the exposed surfaces of the carbon-containing material.

In an embodiment, the biomass is exposed to these energy fields for a period of time such that a maximum yield of activated carbon or recarburiser carbon is formed, the time depending on the ratio of power levels to the mass of carbon-containing material.

In an embodiment, the power levels are chosen such that the temperature of the charcoal is raised to suitable temperatures.

In an embodiment, the method further comprises ceasing exposing the biomass to the microwave energy, whereupon it is removed from the apparatus and collected.

The plasma forms by the added gas being heated sufficiently by the microwave absorbing material to partially ionize the gas, following which the gas phase becomes electrically conductive. The electromagnetic field couples to the electrically conductive gas phase initiating a plasma.

In an embodiment, the added gas flows across the biomass and is removed through an exit tube, at the same time removing volatiles that are produced as a result of applying electromagnetic energy to the biomass.

In an embodiment, the added gas is supplied to the reaction container at a specified flow rate. The flow rate may be specified to control the pressure within the reaction container as well as the rate of removal of bio-oil as opposed to the deposition of pyrolytic carbon on the walls of the reaction container.

In an embodiment, the method further comprises condensing bio-oil(s) emitted from the biomass as a result of applying electromagnetic energy to the biomass in vapour form into condensate. In an embodiment, the condensate is collected in a suitable container associated with a gas condenser.

In an embodiment, the method further comprises collecting non-condensable gases emitted from the biomass as a result of applying electromagnetic energy to the biomass. In an embodiment, the non-condensable gases are collected in a suitable container.

In a further embodiment, steam may be introduced into the added gas.

In an embodiment, the biomass is size-reduced biomass. In a preferred embodiment, the biomass comprises finely divided lignocellulose. One of many examples of such finely divided lignocellulose is sawdust. Further examples include, but are not limited to, wood, cereal plants, seaweed or organic waste, milled agricultural waste, such as straw, the cellulosic fraction from municipal waste, the milled wastes from forestry or agricultural processing, crops grown specifically for such processing, and various scrubby plants, particularly those grown adventitiously on otherwise unused land.

In an embodiment, the biomass is sub-bituminous, bituminous or anthracite coal.

In an embodiment, the direct electromagnetic energy is a longer wave electromagnetic energy. In a preferred embodiment, the longer wavelength electromagnetic energy is microwave energy. In an embodiment, the microwave energy has a frequency range of about 900 MHz to about 3 GHz. Typical frequencies of the electromagnetic energy used are between about 900 MHz and about 1000 MHz, and between about 2 GHz and about 3 GHz. In a preferred embodiment, the frequency of the microwave energy may be one of the industrial, scientific and medical (ISM) bands for industrial heating. The ISM bands for industrial heating include about 896 MHz, 915 MHz, about 922 MHz, and about 2450 MHz. Other frequencies that may also be suitable include about 13 MHz, about 27 MHz, about 40 MHz and about 5 GHz, for example.

The temperature of the activated carbon formation is between 450° C. to 1300° C., preferably between 550° C. to 900° C., The temperature of the recarburiser carbon formation is between 450° C. to 1300° C., preferably between 600° C. to 900° C.

The temperature of the reaction being controlled through the applied microwave power.

The heating of the biomass involves both direct absorption of microwave power, and also indirect power, from black body radiation. The black body radiation results from a plasma formed by the microwave energy. In an embodiment, this indirect black body radiation is at continuously stable power levels.

The heating time is dependent on the power to mass of carbon-containing material, which can be between about 1 minute to about 5 hours, but is preferably between about 10 minutes and about 1 hour.

The interior of the electromagnetic cavity may be pressurized, or evacuated however it is preferred to employ approximately atmospheric pressure.

The interior of the reaction container may be pressurized, or evacuated however it is preferred to employ approximately atmospheric pressure.

The added gas is preferably any gas that does not react significantly with carbon under the conditions, or that reacts only slowly at elevated temperatures. Examples of such inert gases include, but are not restricted to, nitrogen, argon, neon and helium.

Examples of mildly reactive gases include carbon dioxide, carbon monoxide, ozone and steam.

In an embodiment, the method further comprises a step of pretreating the biomass before step (a), the pretreating step comprising heating the biomass in water at a pressure of between 25 and 170 Bar for about 30 minutes to 2 hours and temperature of between about 230° C. and about 350° C.

In an embodiment, the an acid catalyst is added to the water before the pretreating step.

In an embodiment, the method further comprises mechanically pressing the pre-treated biomass to remove free water.

In an embodiment, the reaction container is adapted to contain added gas

In a tenth aspect, the invention consists in activated carbon and/or recarburiser carbon produced by the method of the ninth aspect.

In a eleventh aspect, the invention broadly consists in an activated carbon and/or recarburiser carbon produced by applying electromagnetic energy to an biomass, wherein the activated carbon and/or recarburiser carbon is characterised by a carbon content of at least about 88%.

In an embodiment, the activated carbon and/or recarburiser carbon is characterised by a carbon content of at least about 90%, preferably at least about 95%.

In an embodiment, the activated carbon and/or recarburiser carbon is characterised by a hydrogen content of less than about 1%, preferably less than about 0.3%.

In an embodiment, the activated carbon and/or recarburiser carbon is characterised by a nitrogen content of less than about 1%, preferably less than about 0.4%.

In an embodiment, the activated carbon and/or recarburiser carbon is characterised by a sulphur content of less than about 0.4%, preferably less than about 0.3%.

In an embodiment, the activated carbon and/or recarburiser carbon is characterised by a gross heating value of more than about 30 MJ/kg, preferably about 33 MJ/kg.

In an embodiment, the activated carbon and/or recarburiser carbon is characterised by a moisture loss of less than about 2%, preferably about 1.1%.

In an embodiment, the electromagnetic energy comprises microwave energy. The microwave radiation preferably has a frequency range similar to the range disclosed in relation to the seventh aspect above.

In an embodiment, the activated carbon and/or recarburiser carbon is produced by exposing the biomass to an indirect, black body radiation field while simultaneously applying the direct electromagnetic energy.

In an embodiment, the biomass is plant material. Alternatively, the biomass may be any biomass capable of being converted to charcoal. The plant material may include wood, cereal plants, seaweed, or organic waste. In a preferred embodiment, the plant material is *Pinus Radiata*. In an alternative embodiment, the biomass is sub-bituminous flame coal.

In a twelfth aspect, the invention broadly consists in a method comprising the steps of:
 a) providing biomass;
 b) providing a electromagnetic cavity, the electromagnetic cavity being adapted to enclose and contain a field of electromagnetic energy;
 c) introducing the biomass to the interior of the electromagnetic cavity;
 d) applying electromagnetic energy to the electromagnetic cavity, and the biomass received therein at power levels such that the biomass receives direct electromagnetic energy and an indirect, black body radiation field is produced;
 e) exposing the biomass to the indirect, black body radiation field while simultaneously applying the direct electromagnetic energy such that activated carbon is formed from the biomass; and
 f) using the activated carbon to manufacture steel.

The twelfth aspect may include one or more of the features described above in relation to the seventh or ninth aspects.

In a thirteenth aspect, the invention broadly consists in a method for processing biomass comprising the steps of:
 a) providing biomass;
 b) providing a microwave absorbing material;
 c) providing an electromagnetic cavity, the electromagnetic cavity being adapted to enclose and contain a field of electromagnetic energy;
 d) introducing the biomass container to the interior of the electromagnetic cavity;
 e) introducing the microwave absorbing material to the interior of the reaction container;
 f) applying electromagnetic energy to the electromagnetic cavity and the microwave absorbing material received therein at power levels such that the microwave absorbing material receives direct electromagnetic energy;
 g) allowing heat to flow from the microwave absorbing material to the added gas such that a plasma is produced by the added gas, the plasma providing a radiation field;
 h) exposing the biomass to the radiation field such that recarburiser carbon is formed from the biomass; and
 i) using the recarburiser carbon to manufacture steel.

The thirteenth aspect may include one or more of the features described above in relation to the seventh or ninth aspects.

In a fourteenth aspect, the invention broadly consists in a method for processing biomass comprising the steps of:
a) providing biomass;
b) providing an electromagnetic cavity, the electromagnetic cavity being adapted to enclose and contain a field of electromagnetic energy;
c) providing a reaction container; the reaction container being adapted to enclose and contain raw biomass and processed biomass;
d) introducing the reaction container to the interior of the electromagnetic cavity;
e) introducing the microwave absorbing material to the interior of the reaction container;
f) applying electromagnetic energy to the electromagnetic cavity, biomass and the microwave absorbing material received therein at power levels such that the microwave absorbing material receives direct electromagnetic energy;
g) allowing heat to flow from the microwave absorbing material to the added gas such that a plasma is produced by the added gas, the plasma providing a radiation field;
h) exposing the biomass to the radiation field such that nut coke is formed from the biomass.

The fourteenth aspect may include one or more of the features described above in relation to the seventh or ninth aspects.

In a fifteenth aspect, the invention broadly consists in a method for processing biomass comprising the steps of:
a) providing processed biomass in the form of charcoal;
b) providing an electromagnetic cavity, the electromagnetic cavity being adapted to enclose and contain a field of electromagnetic energy;
c) providing a reaction container;
d) introducing the biomass container to the interior of the electromagnetic cavity;
e) introducing the microwave absorbing material to the interior of the reaction container;
f) reaction container to the interior of the electromagnetic cavity;
g) introducing the microwave absorbing material to the interior of the reaction container;
h) applying electromagnetic energy to the electromagnetic cavity, biomass and the microwave absorbing material received therein at power levels such that the microwave absorbing material receives direct electromagnetic energy;
i) allowing heat to flow from the microwave absorbing material to the added gas such that a plasma is produced by the added gas, the plasma providing a radiation field;
j) exposing the biomass to the radiation field such that graphitic-carbon is formed from the biomass.

The fifteenth aspect may include one or more of the features described above in relation to the seventh or ninth aspects.

The term "comprising" as used in this specification means "consisting at least in part of"; that is to say when interpreting statements in this specification which include "comprising", the features prefaced by this term in each statement all need to be present but other features can also be present. Related terms such as "comprise" and "comprised" are to be interpreted in a similar manner.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

As used herein the term "(s)" following a noun means the plural and/or singular form of that noun.

As used herein the term "and/or" means "and" or "or", or where the context allows both.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

The invention consists in the foregoing and also envisages constructions of which the following gives examples only.

DEFINITIONS

The term "activated carbon" means any material that is essentially comprised only of carbon, and for which one gram of such material has a surface area in the vicinity of 500 square meters, or greater, as calculated by the adsorption of nitrogen in the standard BET test.

The term "re-carburiser carbon" means any material that is mainly comprised of carbon, and has a fixed carbon content >88%, volatile content <1%, moisture content <2%, ash content <5%, nitrogen content <1%, sulphur content <0.4%, calorific value >3028 MJ/kg, and hydrogen content <1%.

The term "nut coke" means any material that is mainly comprised of carbon and has a fixed carbon content >84% (dry basis), Sulphur content <0.5%, Nitrogen content <0.5%, volatile matter content <2%, moisture content <10%. Ash <13%. The nut coke is used as a fuel for raising heat in the steel making process.

The terms "biomass" as used in this specification refers to material of plant origin, including that having undergone processing. The term "biomass" used in this specification can also refer to, sub-bituminous, bituminous or anthracite coal, including that having undergone processing.

The term "size reduced", including any other verbal form, means that the material so described is present in parts smaller than originally found. In an embodiment, such size reduction involves converting the biomass to pieces of 1 cm in any dimension, or smaller, by any means, including but not limited to, cutting, milling, chipping, or adventitious size reduction, e.g. the production of sawdust while milling timber.

The term "comprising" as used in this specification means "consisting at least in part of"; that is to say when interpreting statements in this specification which include "comprising", the features prefaced by this term in each statement all need to be present but other features can also be present. Related teens such as "comprise" and "comprised" are to be interpreted in a similar manner.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting. Where specific integers are mentioned herein which have known equivalents in the art to which this invention relates, such known equivalents are deemed to be incorporated herein as if individually set forth.

As used herein the term "(s)" following a noun means the plural and/or singular form of that noun.

As used herein the term "and/or" means "and" or "or", or where the context allows both.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

The invention consists in the foregoing and also envisages constructions of which the following gives examples only.

BRIEF DESCRIPTION OF THE DRAWINGS

The present invention will now be described by way of example only and with reference to the accompanying drawings in which.

DETAILED DESCRIPTION OF A PREFERRED EMBODIMENT

Figure 1:
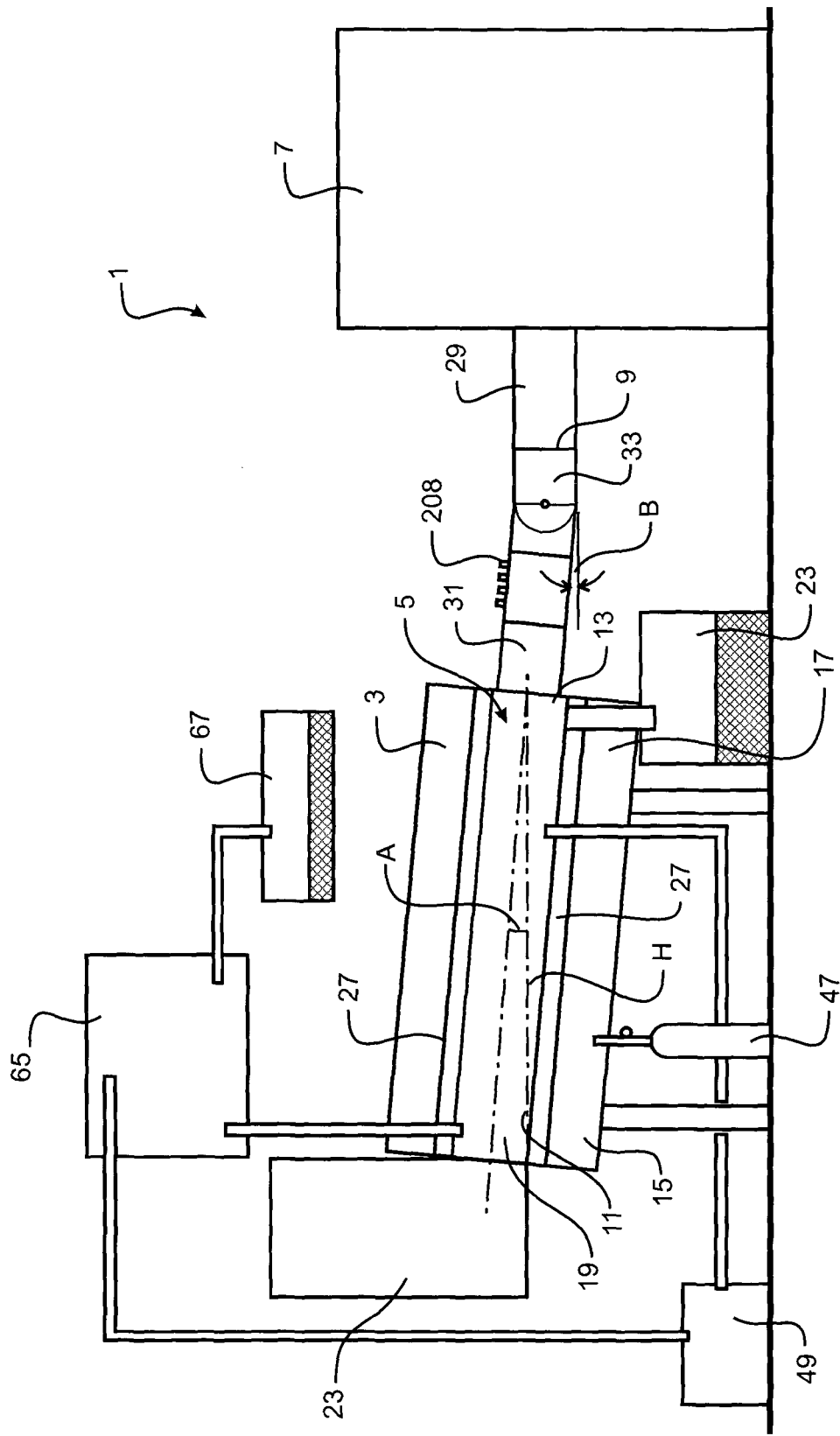
FIG. 1 is a schematic drawing of a first preferred embodiment apparatus for carrying out the method of the invention.
Figure 3:
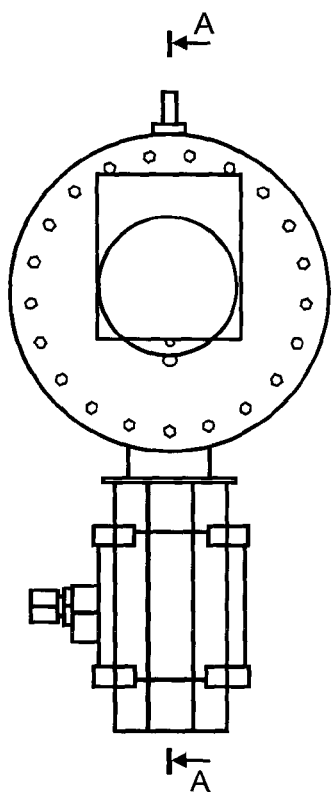
FIG. 3 is front view of a second preferred embodiment apparatus.
Figure 4:
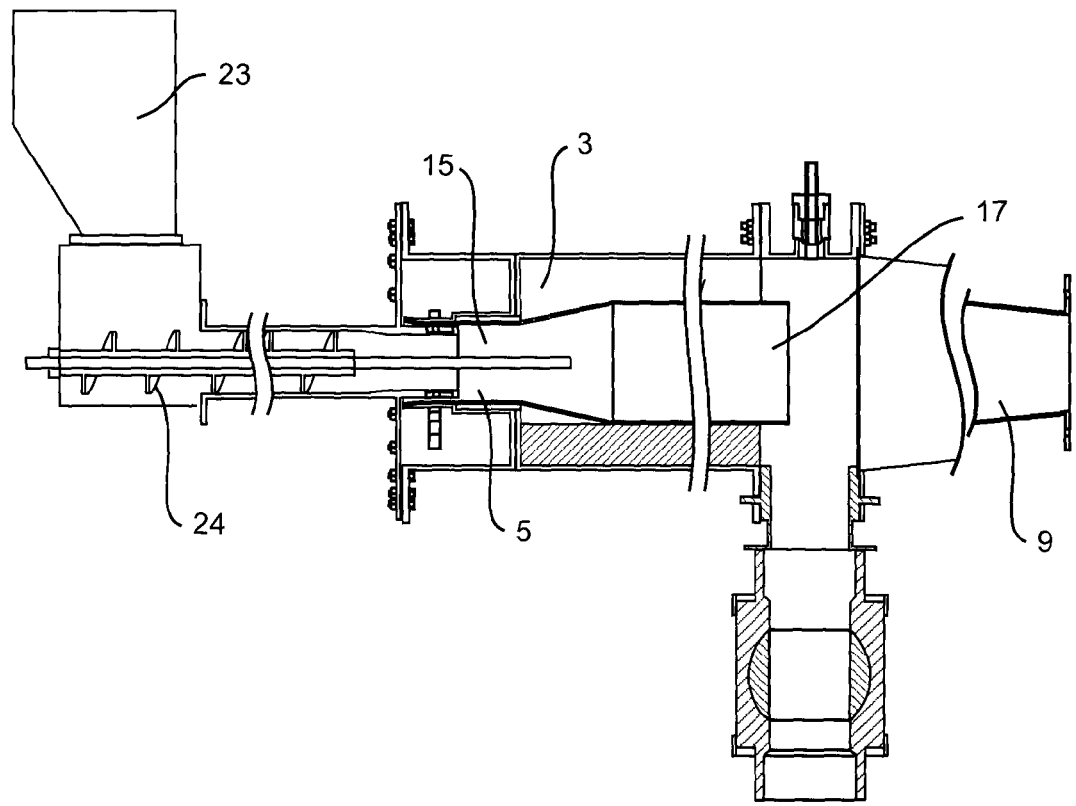
FIG. 4 is a cross-sectional view taken though line A-A of FIG. 3.
Figure 7:
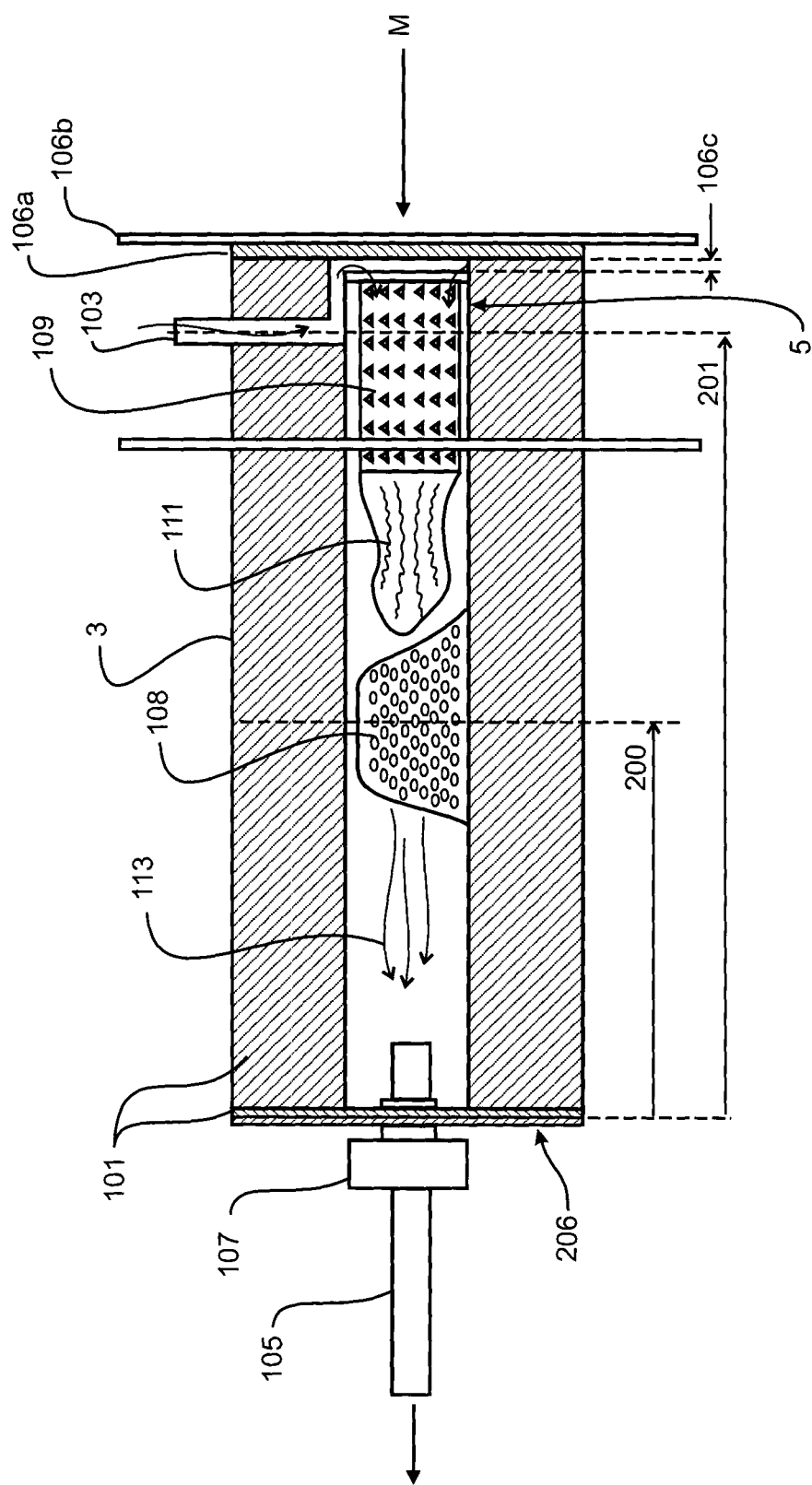
FIG. 7 is schematic drawing of a second suitable apparatus for carrying out the method of the invention.
Figure 8:
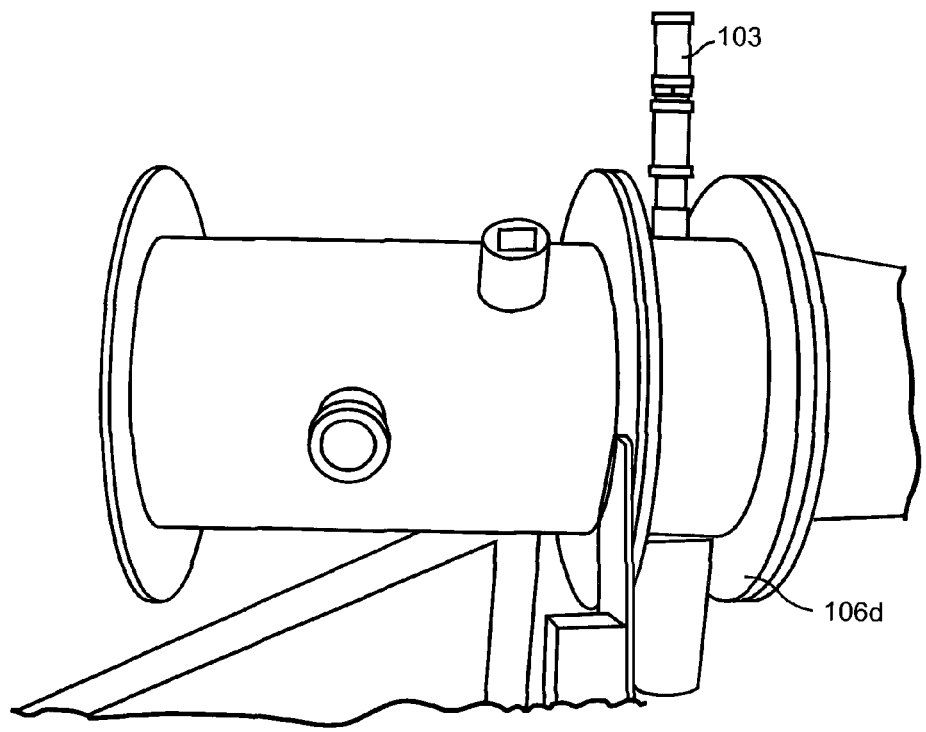
FIG. 8 is a side view of the apparatus of FIG. 7
Figure 9:
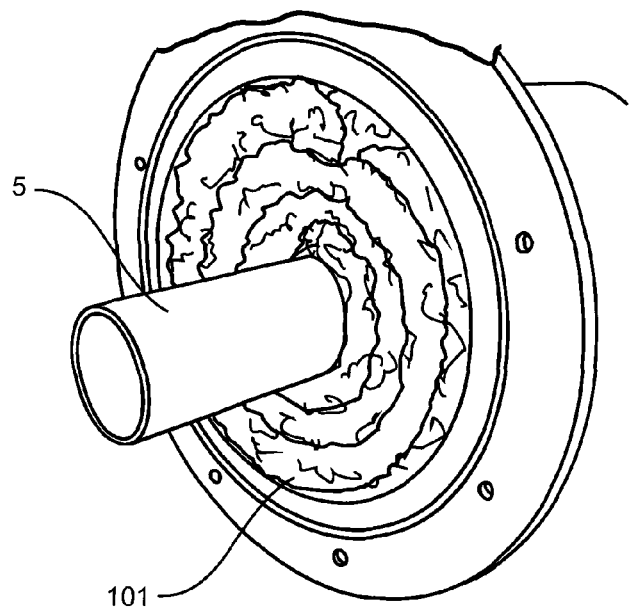
FIG. 9 is a partial perspective view of the outlet end of the apparatus of FIG. 7 with the back plate removed and the reaction container partially removed.
Figure 10:
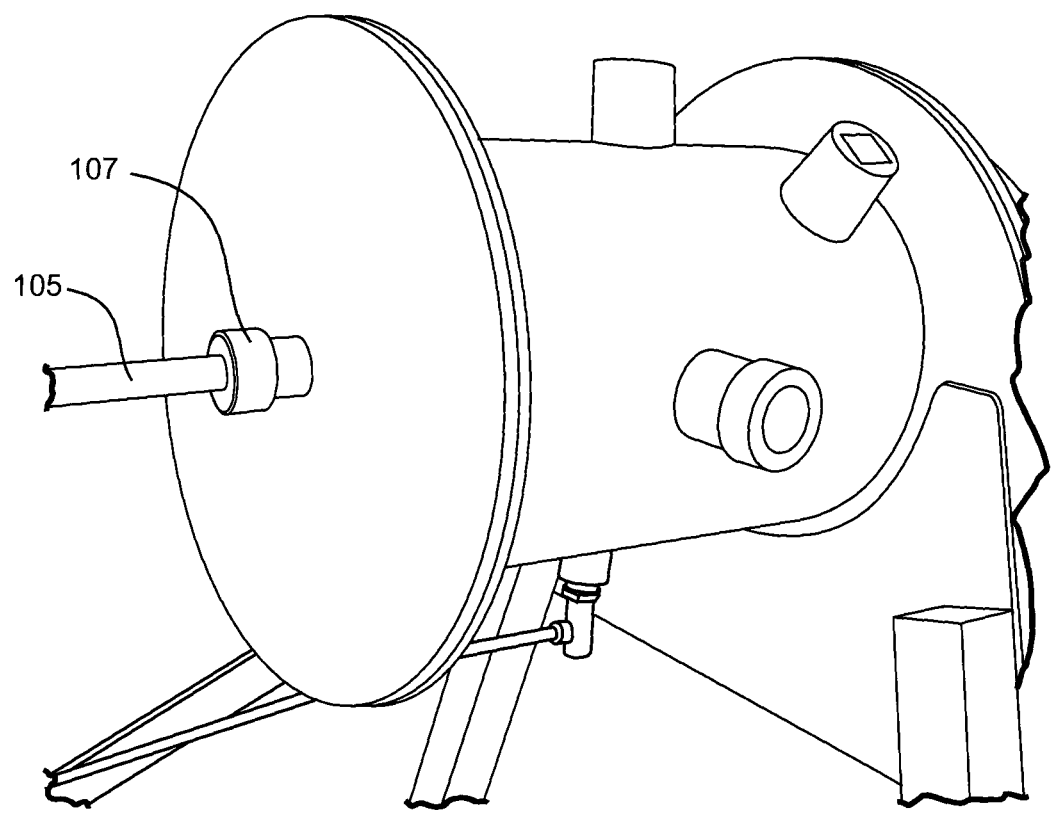
FIG. 10 is a perspective view of the apparatus of FIG. 7.
Figure 11:
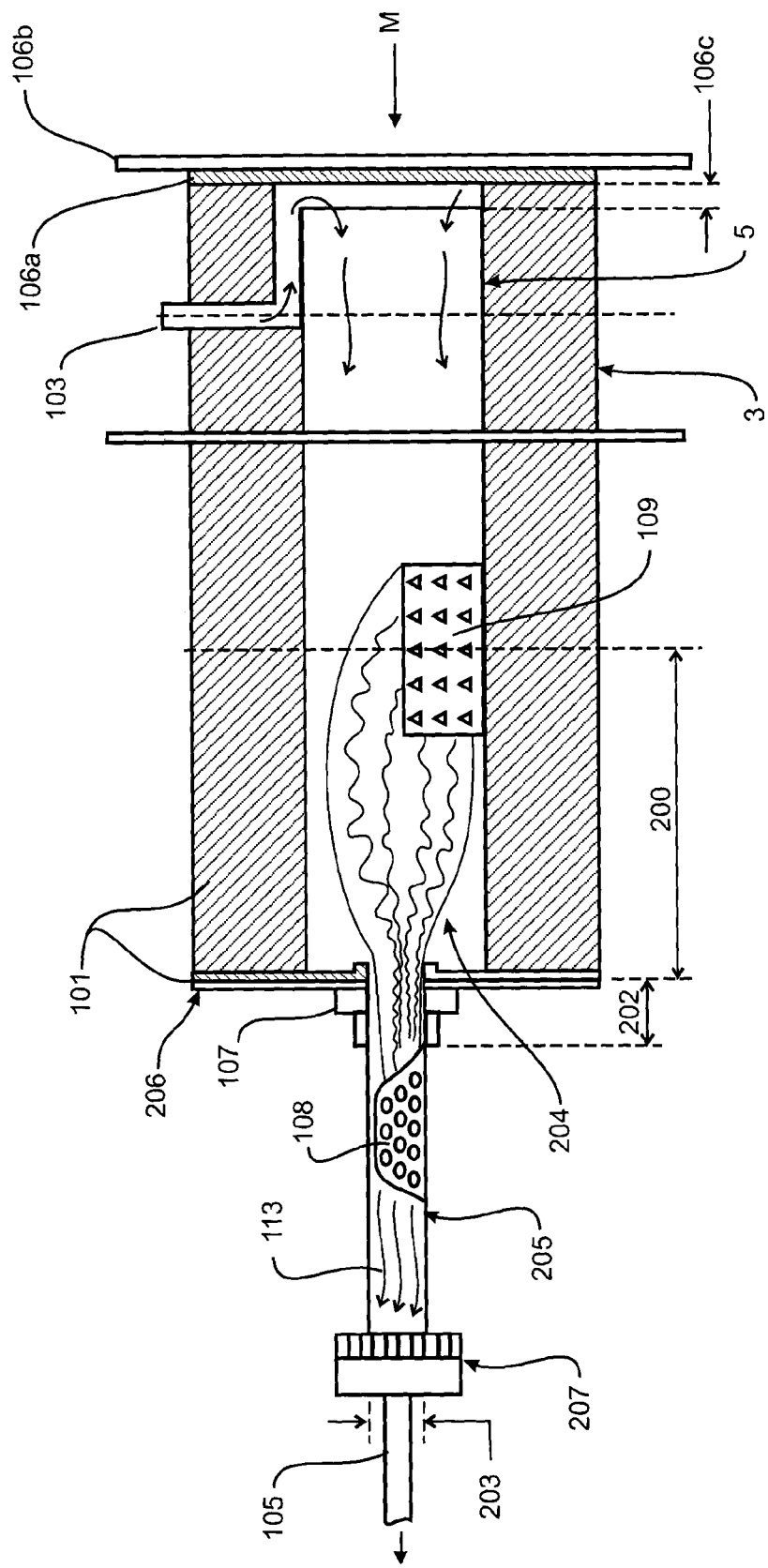
FIG. 11 is a schematic drawing of an embodiment of the second apparatus for carrying out the method of the invention.

FIG. 1 is a schematic drawing of a first preferred embodiment apparatus 1 for processing biomass or organic material and FIGS. 3, 4 and 7 show a second preferred embodiment apparatus for processing biomass. Unless described, the features and operation of the second preferred embodiment are the same as the features and operation of the first preferred embodiment.

The apparatus has a housing or electromagnetic cavity 3, a rotatable tube or reaction container 5, an electromagnetic generator in the form of a microwave generator 7, and a waveguide 9, a waveguide impedance matching network 208, and a vacuum generator or pump 49.

The invention uses microwave technology to convert biomass such as wood into charcoal and liquid and/or gaseous by-product. When microwave energy is applied to biomass, microwave energy is absorbed and converted to heat in a way that can indirectly accelerate selected chemical reactions by exciting bending modes that bring the molecule closer to specific reaction transition states. The overall result is that microwave energy can promote the formation of selected products, as opposed to a broader range of materials arising from thermal excitation.

In charcoal, carbon becomes "fixed" and is capable of being stored long-term ($>10^3$ years) if nothing is done to release the carbon back into the atmosphere. By comparison, raw plant material will rot relatively easily, making it suitable generally for short-term storage only. Thus, sequestering carbon gases in charcoal rather than directly as unprocessed plant material increases the amount of time for which the carbon gases can be stored. By using microwaves, biomass such as plants can be converted into charcoal in an energy efficient manner.

During this process, a liquid and/or gaseous by-product is emitted from the biomass. The liquid may be emitted in the liquid or vapour phase. The liquid and/or gaseous by-products emitted from the biomass comprise a liquid and/or gaseous by-product known as bio-oil(s), or tar(s). The liquid preferably exudes from the biomass as a result of applying microwave radiation to the biomass. The liquid is a by-product of the process that produces charcoal from the biomass by transmitting electromagnetic energy to the biomass. The liquid and/or gaseous by-product comprises many products including a useful by-product in the form of a biofuel or additive for a biofuel.

With reference to FIG. 1, the rotatable tube 5 is housed by the housing 3 and is rotatable within the housing. The rotatable tube is preferably a quartz tube, in particular, a high purity fused quartz. The rotatable tube 5 has an inlet end 11 for receiving un processed biomass an outlet end 13 for discharging processing biomass. The housing 3 has an inlet end 15 and an outlet end 17 that correspond to the inlet and outlet of the tube 5. The diameter of the tube is sufficient to allow the biomass to move relatively freely and tumble through the tube, rather than pack. The loading of the biomass is determined by the power source, and the tube diameter will be chosen or designed to have a diameter to allow the maximum loading of biomass to tumble freely.

With reference to FIG. 1, a feeder end plate may be positioned over the inlet end of the housing 3 and a delivery end plate may be positioned over the outlet end of the housing. The feeder end plate is adapted to allow the unprocessed biomass to be introduced to the tube from an infeed hopper 23. In the schematic drawing of FIG. 1, the infeed hopper 23 feeds the unprocessed biomass directly into the rotatable tube 5.

Alternatively, the infeed hopper may feed material to the inlet via suitable passages or conduits. With reference to FIG. 4, the apparatus has an auger 24 for feeding feeds the unprocessed biomass into the rotatable tube 5. The biomass may be introduced to the tube in a continual process or a batch process.

The delivery end plate is adapted to allow microwave energy to be introduced to the tube via the waveguide 9. The delivery end plate is preferably a quartz plate. The apparatus has a partition between the waveguide and the housing 3. In the preferred embodiment shown, the charcoal is discharged from the outlet end of the tube via a pipe or passage to the collection hopper 23. In the preferred embodiment shown, the charcoal will fall into the hopper under the influence of gravity. The collection hopper is a sealed container with intermittent air locks to allow the processed product to be removed on a continual basis. With reference to FIG. 4, the apparatus has a ball valve, which is operated as a rotary valve positioned in a passage of a pipe between the tube 5 and the collection hopper. The valve has a disc in the ball, which provides an area to hold processed material.

With reference to FIG. 1, the rotatable tube 5 is inclined at an angle A relative to a horizontal axis H. The angle of the rotatable tube 5 relative to the horizontal axis is adjustable to control the speed at which the biomass is processed. The angle of the tube may be adjusted between about 3 degrees and about 30 degrees, for example.

In the preferred embodiment shown, the housing 3 and tube 5 are both inclined at an angle relative to the horizontal axis H and the angle of the tube 5 relative to the housing 3 is fixed. To adjust the angle of the rotatable tube 5 relative to the horizontal axis, the angle of the housing 3 is adjusted. In the preferred embodiment, the housing 3 is mounted on four adjustable legs 25 that allow the apparatus to be tilted. The angle is adjusted by changing the height of the housing legs 25. The height and tilt angle may be adjusted manually or automatically as part of a control system.

Alternatively, the housing 3 may be a stationary component and the angle of the rotatable tube 5 relative to the horizontal axis may be adjusted by adjusted the angle of the rotatable tube 5 relative to the housing.

The rotatable tube 5 is substantially pressure sealable and substantially microwave sealable. The apparatus has insulating material 27 surrounding the rotatable tube. The material used to insulate the exterior surfaces of the rotatable tube 5 is preferably fibreglass. However, the insulating material may be any substantially non-conductive insulating material that is suitable for use in temperatures greater than about 300° C., for example. Insulating material used in places that will be exposed to microwave energy will preferably have the same thermal properties as the material used on exterior surfaces (as above) plus low dielectric loss characteristics. For example, a small amount of low dielectric loss insulating material is placed in front of the waveguide/rotary tube partition. The waveguide partition is a rigid low dielectric loss material such as pure quartz, or ceramic, for example.

Electrical contact and integrity is maintained between the stationary end plates and the rotating tube with microwave attenuating quarter wave chokes.

The microwave generator 7 is associated with the rotatable tube 5 for applying or transmitting electromagnetic energy to the rotatable tube 5 and the biomass received therein. The microwave generator 7 is configured to generate electromagnetic radiation. Preferably the electromagnetic radiation has a frequency range of super high frequency (SHF) or extremely high frequency (EHF) that are typical of microwaves. Optionally, the microwave generator 7 generates microwave radiation at a suitable frequency range. The microwave generator 7 has a frequency range of about 900 MHz to about 3 GHz. Typical frequencies of the electromagnetic energy used are between about 900 MHz and about 1000 MHz, and between about 2 GHz and about 3 GHz. In a preferred embodiment, the frequency of the microwave radiation may be one of the industrial, scientific and medical (ISM) bands for industrial heating. The ISM bands for industrial heating include about 915 MHz, about 922 MHz, and about 2450 MHz. Other frequencies that may also be suitable include about 13 MHz, about 27 MHz and about 40 MHz, for example.

The electromagnetic radiation is produced by any suitable apparatus. Suitable apparatus includes, triode, klystron and magnetron tubes as well as solid state diodes and solid state transistors, for example.

With reference to FIG. 1, the microwave radiation generated by the microwave generator 7 is guided to the electromagnetic cavity by the waveguide 9. The waveguide is a hollow metal tube for transmitting microwave radiation from the microwave generator to the electromagnetic cavity. In an alternative embodiment, the microwave radiation generated by the microwave generator 7 is transmitted to the electromagnetic cavity by a coaxial cable and is radiated into the electromagnetic cavity 3 via an antenna structure. A coaxial cable is an electrical cable with an inner conductor surrounded by a rigid or flexible, tubular insulating layer, surrounded by a tubular electrically conductive shield. The reaction container 5 and biomass 108 both reside within the electromagnetic cavity and are exposed to microwave radiation generated by the microwave generator 7.

The angle of the waveguide is adjustable corresponding to the adjustability of the angle of the rotatable tube 5. The waveguide 9 has a first horizontal portion 29 extending from the microwave generator 7 and a second portion 31 extending from the first portion and towards the rotatable tube 5. The second portion 31 extends away from the first portion 29 at an angle B relative to the first portion. The angle B corresponds to the angle A of the rotatable tube. The angle of the second portion 31 relative to the first portion 29 is adjustable. The second portion is operatively connected to the first portion by a connecting portion 33 that allows the first and seconds portions to pivot relative to each other.

Figure 2:
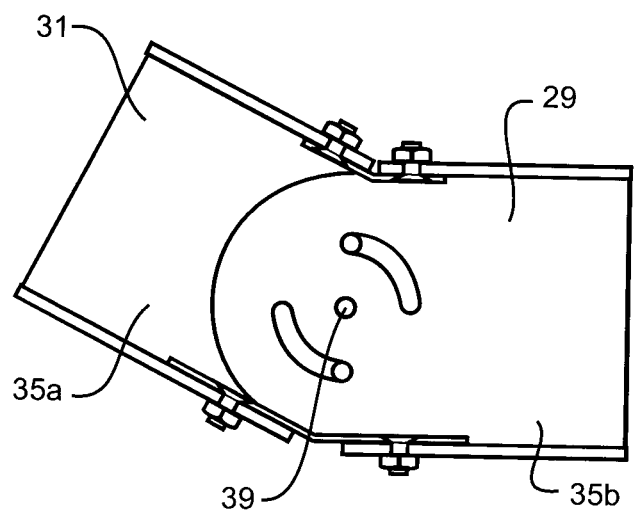
FIG. 2 is a schematic drawing of a preferred embodiment adjustable waveguide.
Figure 2:
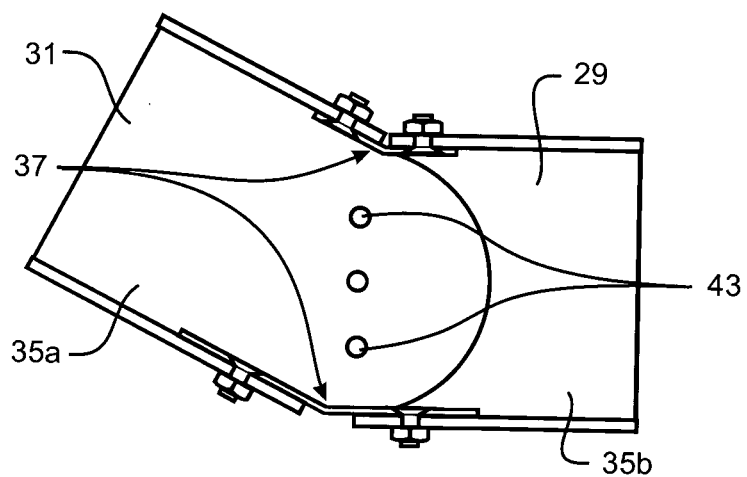

In the preferred embodiment shown, the waveguide 9 is a hollow metallic component having a rectangular cross section. The connecting portion 33 has a corresponding rectangular cross section. With reference to FIG. 2, the connecting portion is formed by two sets of side plates 35a, 35b and two deflection plates 37. The sets of side plates 35a, 35b form the left and right sides of the connecting portion 33 and the deflection plates 37 form the top and lower sides of the connecting portion. In an embodiment, the apparatus may be terminated with a matched load to absorb residual energy not absorbed by the biomass and to prevent the formation of a standing wave pattern along the length of the reactor. The matched load can be in form of a waveguide water load that has impedance of about 50 ohms at the frequency of operation (frequency of the microwave generator). Preferably the water load will be fitted with an electric field sensor to detector to measure the amount of power not absorbed by the biomass.

In an embodiment, the reaction container may be surrounded by a losses material with a dielectric constant to increase the electric field intensity along the centre axis of the reactor through which the biomass tumbles and is exposed to the concentrated electric field. Preferably, the material will have a dielectric constant greater than 20, for example.

The deflection plates 37 may be formed from a rigid or resilient conductive material. As the angle between the first portion 29 and the second portion 31 of the waveguide is altered, the deflection plates move to keep contact with the tubular sections. The deflection plates do not have to be attached the side plates, provided there is adequate contact on both sides of the opening between the tubular sections.

The deflection plates 37 form a shield for the microwaves and a conductor for any circulating currents returning along these sections.

The connection portion 33 also has an axle 39 extending between the sets of side plates 35a, 35b, which allows the first portion 29 and the second portion 31 of the connecting portion to pivot relative to each other. Further, in each set of side plates, one side plate has one or two machined curved slots 41 having a similar radius. The other side plate has one or two apertures 43 corresponding to the curved slots. A fastener (not shown) extends through one of the curved slots and one of the apertures to connect the side plates together, while also allowing adjustment of the side plates relative to each other. The adjustment of the side plates adjusts the angle of the first and second portions. When connected together, the side plates form a solid wall impervious to the microwaves.

The waveguide 9 is constructed from a suitable material. The waveguide may be constructed from either conductive or dielectric materials, for example.

In the preferred embodiment shown, the wave guide also has an adjustable tuner. The tuner is used to match the characteristic impedance of the reactor containing the biomass (load) to the electromagnetic generator (source). By matching the source and load impedances, optimum energy coupling into the biomass may be realised. The tuner may be manually adjusted or automatically as part of a control system.

The apparatus also has a system for removing and collecting bio-oil(s) emitted in vapour or gaseous form. In particular, the apparatus may have a vapour/gas extraction system that may include a source of carrier gas, in the of a pressurised container 47, a condenser, and pressure regulators. The pressurised container may provide the interior of the rotatable tube 5 with a carrier gas. The carrier gas is an inert gas and may comprise carbon dioxide, argon, or nitrogen, for example. The carrier gas may carry the bio-oil(s) in gaseous/vapour form from the interior of the tube to the condenser. The carrier gas may then continue back to the tube to continually carry the gasses to the condenser. The gas extraction system may be a closed system.

Figure 6:
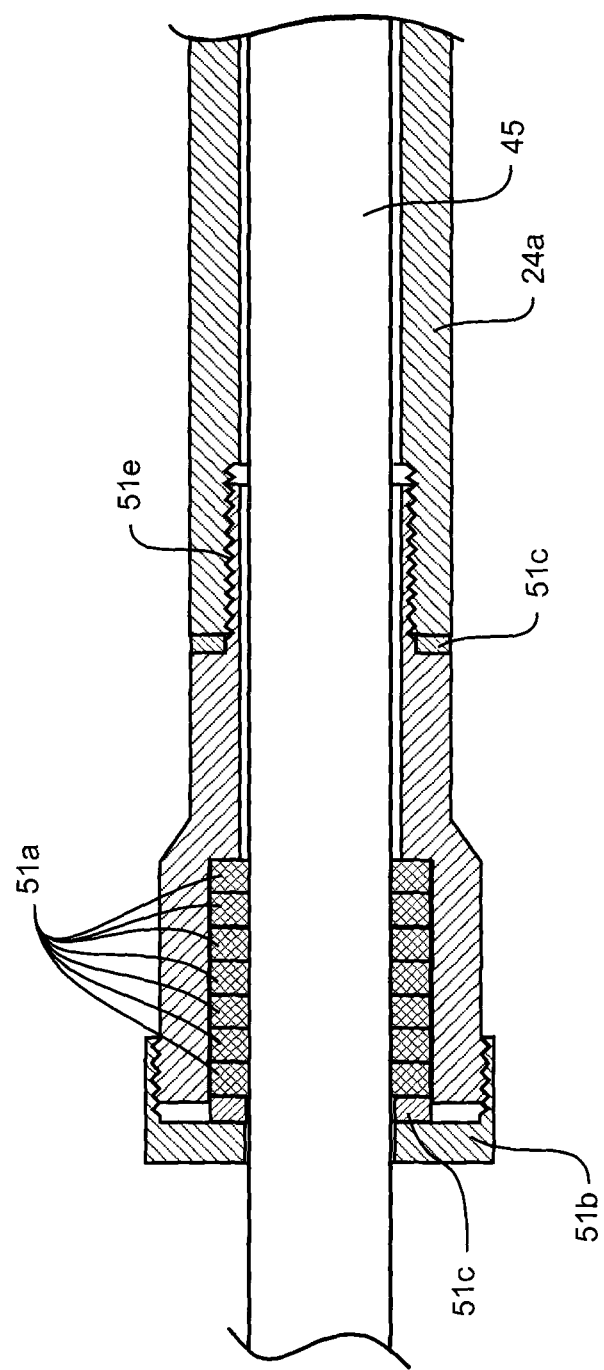
FIG. 6 is a detail cross-sectional view of the gas take-off/carrier gas injection point of the apparatus.

With reference to FIGS. 4 and 6, the apparatus has a first gas take-off/carrier gas injection point near the inlet end of the housing 3. In particular, the apparatus has a first gas take-off/carrier gas tube 45 that extends through the housing 3 and through the auger shaft 24a into the rotatable tube 5.

With reference to FIG. 4, the apparatus has a second gas take-off/carrier gas injection tube 46 near the outlet end of the housing 3. Each of the first and second gas take-off/carrier gas tubes 45, 46 is preferably a quartz tube, in particular high purity fused quartz. Each of the first and second gas/take off tubes 45, 46 can be used to either supply the carrier gas to the rotatable tube, or remove the carrier gas and the bio-oil(s) emitted in vapour or gaseous form. This allows the direction of flow of the carrier gas to be altered.

In the embodiment shown, the first gas take-off/carrier gas injection tube 45 has a water gland 51. With reference to FIG. 6, the water gland 51 is a quick-release graphite-based mechanical seal that allows the gas take-off/carrier gas tube to be extended or retracted within the rotatable quartz tube 5, as required. The water gland 51 has a graphite gland packing material 51a, a threaded locking cap 51b, that allows compression of the gland packing material, and washers 51c.

Before operation of the apparatus 1, the water gland 51 is loosened, and then the tube is moved to a required position inside the rotatable quartz tube 5. The water gland 51 is then re-tightened, which provides an air/water tight seal around the gas take-off/carrier gas tube.

The gas take-off/carrier gas tube, is fitted inside the auger shaft 24a. The gas take-off/carrier gas tube does not rotate with the auger shaft 24a but is held stationery by a gear and a flange 53. The mechanical seal rotates with the auger 24. The gland assembly has an external thread 51e for attachment to a corresponding internal thread of the auger shaft 24a. The water gland 51 allows extraction of volatiles or injection of carrier gas at required positions along the length of the rotatable quartz tube.

The apparatus has pressure regulators to regulate the pressure within the rotatable tube 5 and within the gas/vapour extraction system. In the preferred embodiment shown, the pressure regulator is a vacuum pump 49. In addition, the pressurised container 47 can be used as a pressure regulator. The pressure may be regulated by adjusting the rate at which the carrier gas is introduced and/or adjusting the rate of the vacuum pump. The apparatus also has a variable flow regulator, gas flow indicator, gas pressure indicator. The pressure inside the rotatable tube 5 can be regulated to either be positive or negative relative to atmospheric pressure.

The apparatus 1 further comprises a chipper for size reducing the biomass 108. The biomass 108 is chipped before it is put into the reaction container. The chipper may be connected to the other components of the apparatus. Alternatively, the chipper may be a separate stand alone component of the apparatus.

The apparatus has a control system including temperature, pressure probes and oxygen probes. In the preferred embodiment, the temperature probes are isolated junction thermocouple probes that measure the temperature of the biomass within the rotatable tube. Alternatively, faster response bonded junction thermocouples could be used, for example. Materials in the reaction container may include biomass 108, microwave absorbing material 109, volatiles 113, plasma 111 or walls of the reaction container 5.

The control system receives information from the temperature probe and uses that information to control the power output of the microwave generator 7 and/or the throughput/dwell time of the biomass in the rotatable tube 5 to maintain the temperature within a predetermined operating range. The throughput/dwell time is controlled by a combination of the rotation rate of rotatable tube, the angle of the rotary tube and the feed rate of the biomass from the infeed hopper.

The apparatus 1 further includes vacuum or pressure probes (not shown) for measuring the pressures of the electromagnetic cavity and reaction container. The temperature is preferably measured using Fabry-Perot fluro-luminescence thermocouples.

The control system also receives information from the pressure probe. That information can be used to control the operation of the pump and/or the supply of the carrier gas to maintain the pressure in the rotatable tube 5 within a predetermined operating range. Pressure is controlled by controlling the additional or removal of the carrier gas.

The control system may also control and adjust the angle of the rotatable tube 5 relative to the horizontal axis, the rate of rotation of the rotatable tube, and/or the rate that biomass is added to the rotatable tube.

The apparatus 1 further includes a waveguide impedance matching network in the form of an automatic 4-stub waveguide tuner.

A monitoring apparatus or control system monitors the input waveguide 9 impedance into the electromagnetic cavity 3. The temperature, pressure and waveguide impedance, electric field voltage data gathered by the monitoring apparatus is then used to control the heating process. The control system controls the microwave generator 7, the waveguide impedance matching network 208 and the vacuum generator 49 to maintain the amplitude of electromagnetic field, temperature and pressure in the reaction container 5 within a predetermined operating range.

Figure 12:
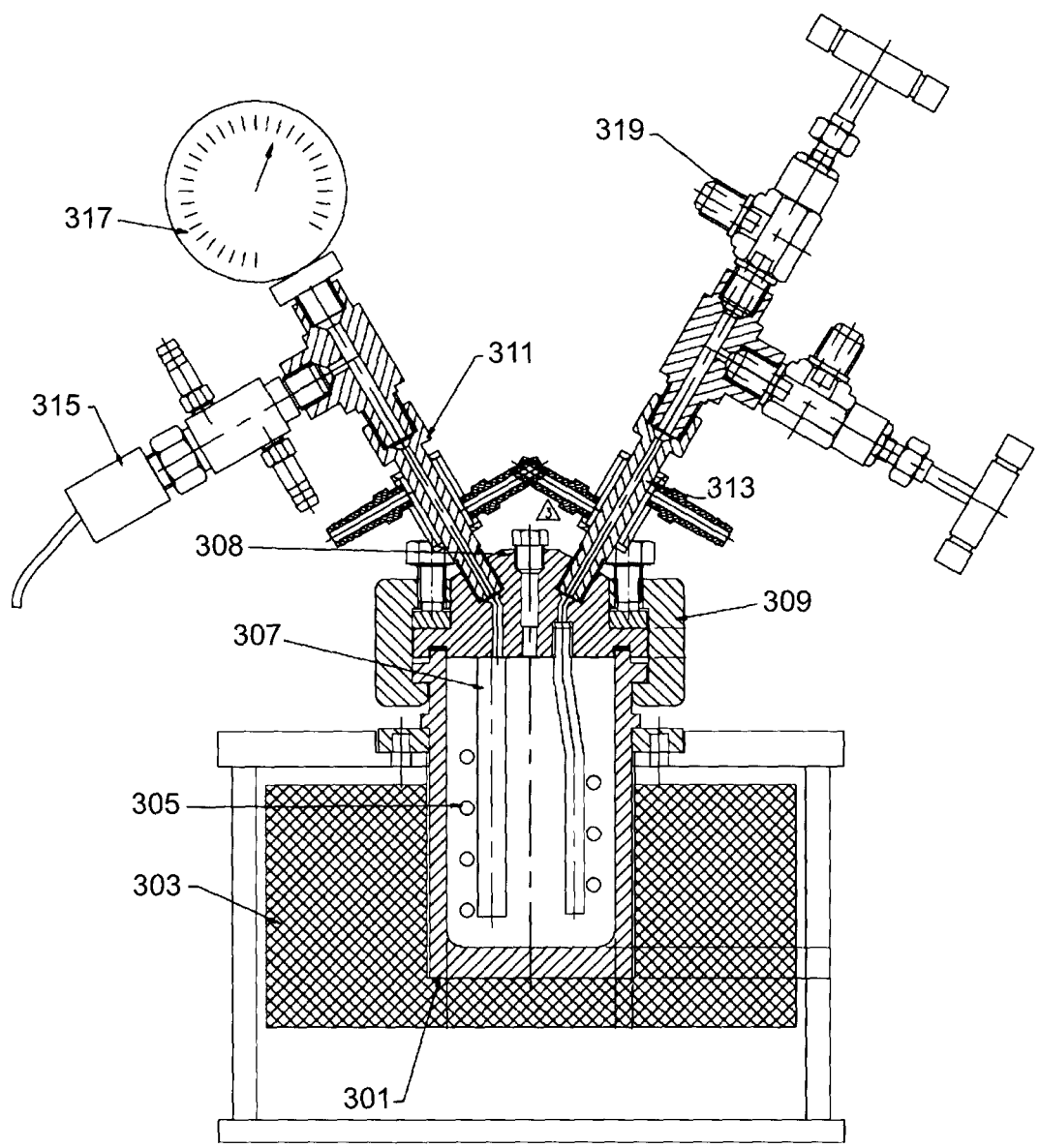
FIG. 12 is a cross-section view of a hydrothermal apparatus.

The apparatus also includes a hydrothermal reactor, shown in FIG. 12.

First Preferred Method of Operation

A preferred method of operating the apparatus will now be described. The apparatus may operate in a continuous process or a batch process.

Biomass, typically plant material such as wood, cereal plants, seaweed or organic waste, is selected. Selection of biomass for the sequestration process is based on how effectively a particular type of biomass fixes carbon dioxide, or the required bio-oil(s) that may be obtained from it. In the case of plant material, such as trees, the effectiveness with which the plant material fixes carbon dioxide will typically be determined by assessing how much carbon dioxide is fixed over a particular growth period for the plant. More effective plants (such as trees) will fix the highest amount of carbon dioxide over the shortest possible growth period.

The biomass is preferably chipped material. It will be appreciated that the size will vary. Chipping the biomass makes it easier for the material to be converted into charcoal using microwave technology, and easier to collect volatiles that may be formed.

The biomass is then placed into the infeed hopper. The infeed hopper feeds the material to the rotatable tube. The infeed hopper feeds the material to the rotatable tube 5 either continually or in batches. In the preferred embodiment, the inlet is continually filled with biomass, which creates a constant flow and a partial pressure block at the inlet.

When electromagnetic radiation in the form of microwaves is applied to the biomass the microwaves heat the material biomass to convert the biomass into bio-char and bio-oil(s). The microwave energy will travel in a direction generally parallel to the longitudinal axis of the rotatable tube. The microwaves heat the feed material as it travels from the input end of the tube to the outlet end of the rotatable tube.

Carrier gas is supplied to the rotatable tube 5. During operation of the apparatus, the carrier gas is supplied either continually or as required. The heat produced by the microwaves drives off the bio-oil(s) as vapours, which are then carried from the tube by the carrier gas and passed through a condenser and collected in the collection device. The spent carrier gas then passes back through the housing 3 and into the tube to continue carrying the gasses to the condenser. This is a closed system under slight pressure or vacuum. The combination of gasses within this system can be controlled.

In an alternative embodiment, the steam may act as a carrier gas. In a further alternative embodiment, rather than using a carrier gas, the apparatus can be operated under a partial vacuum or reduced pressure.

The inert gas flow is counter-current to the biomass, such that the volatiles are swept back over incoming biomass yet to reach pyrolysis temperatures. When this happens, the less volatile material condenses on the incoming biomass and transfers heat to the incoming biomass. The condensation of the less volatile material at or towards the inlet end of the quartz tube assists absorption of further microwave energy because liquid absorbs microwave energy better. The condensation of the less volatile material also permits the collection of the more useful and more volatile bio-oils substantially free of the less volatile or heavy tars. Eventually, an equilibrium will be reached (assuming constant power and feed rates) which means that the system behaves as one with continuous heating, and the removal of desirable oils happens at each specific temperature.

The majority of the bio-oil(s) and water vapour are driven off at the beginning of the tube as the biomass dries. As the biomass continues to travel along the length of the tube, the heat produced by the microwaves will convert the biomass into charcoal.

The application of microwave energy to the biomass will create variation(s) in the temperature of the material. In the preferred embodiment, the apparatus has temperature sensors spaced along the length of the tube.

The input of the microwave energy, the operating pressure and the throughput of the biomass are controlled to heat the feedstock to give the required products. For example, to achieve the required bio-oil(s) and/or charcoal(s).

Once the biomass has been effectively carbonised into charcoal, the charcoal will fix the carbon potentially for more than $10^3$ years. Charcoal is highly resistant to microbial breakdown and once formed is effectively removed from biospheric carbon reservoirs, including the atmosphere and ocean.

Once the carbon in the biomass is fixed in the charcoal that has been produced by the method, the charcoal can be stored in sinks. The preferred sinks for the charcoal are natural carbon repositories such as soils and mined and open cast coal mines. Alternatively, the charcoal could be pulverised and placed as slurry into exhausted oil and gas reservoirs. Any sink that provides a moist and cool environment can be used for storage of the charcoal. The charcoal may be buried or deposited in surface deposits.

The bio-oil(s) produced using the apparatus and method describe above has an energy content of at least about 21 MJ/kg. Tabulated values for *Pinus Radiata* are 16-19 MJ/kg.

Bio-oils come in several classes. Thus those emitted at the lowest temperatures include plant terpenes; those emitted at about 350° C. include saccharide pyrolysis products, such as 1,6-anhydroglucose, while those emitted above 400° C. include lignin decomposition products, which are largely phenolic, with methoxyl, alkenyl, alkyl, or formyl substitution. These may be used as a crude fuel as is, or they can be the feedstock for hydrotreating to form hydrocarbons.

Experimental Results

Experimental results from applying microwave energy to plant material are provided below. During the testing, microwave energy was applied to *radiata* pine (*Pinus radiata*). The source of *Pinus radiata* was wood chips from a saw mill.

The next step in the bio-oil collection was to run the machine to produce charcoal and during this process, to collect the oils produced. This was completed many times and selected samples of condensate were chosen from an operating temperature of about 300° C. and a vacuum of about 10 kPa. These specific samples were chosen because when the analysis of the chemical composition of these samples was determined, further investigation could be done to see how different processing conditions affect composition. These condensate samples contained a high percentage of water. This water had to be separated out before being tested with a gas chromatogram coupled to a mass spectrometer (GCMS). This process was completed using three different methods to produce three different types of samples free of water. The first sample observed was pure bio-oil, the second, of distilled bio-oil and the third, of volatile chemicals contained within bio-oil.

In all three cases the condensate was mixed with methylene chloride—a non-polar solvent. The solution therefore forms two layers; one of the methylene chloride and bio-oil and the other, of water. The water was then removed using a separation funnel. After this process, the pure bio-oil remained. This was then used as the first sample. In the other two samples, the same process was completed and furthered; the methylene chloride layer was then distilled and because methylene chloride has a low boiling point of 40 degrees Celsius, it is easily separated from the other organic molecules within the bio-oil. The residue still contained when the methylene chloride was removed made up the second sample. The third step was to take the residue and keep distilling it to a much higher temperature. This distilled off the volatile organic molecules and left the tars remaining. These volatile organic molecules made up the third sample.

All three of these samples; the pure bio-oil, the distilled bio-oil and the volatile chemicals contained within bio-oil were analysed using a GCMS. The GCMS then returned a detailed breakdown of the composition contained in each sample, including their relative proportion.

The calorific value of a sample of the pure oil was obtained. With this value and information gathered during the process run, such as the amount of condensate collected and the amount of charcoal produced, the initial amount of feed stock, and moisture content, the total amount of bio-oil produced could then be calculated. This information was then used to calculate the yield of bio-oil per kilogram of wood chips on a wet and dry basis. Also, with this calorific value and the known moisture content of wood, the amount of bio-oil required to pre dry the wood could also be calculated. The full calculation can be seen below. The relatively high energy content obtained was most probably the result of low water content and suppression of secondary reactions of volatiles during microwave heating.

The tars are mainly primary pyrolysis products of cellulose and lignin that have become further heated and have reacted with each other. In the countercurrent gas flow, the intermediates are swept to cooler zones, and if they do form tars, the tars do not revolatalize, but rather enter hotter zones and become char, or re-pyrolyse. Thus the counter-current gas flow should greatly reduce the production of non-volatile tars. Also by taking the volatiles into cooler zones, rather than increasingly hotter zones, such secondary reactions should be slowed or suppressed.

| Feedstocks | |
| --- | --- |
| Description | Moisture % |
| Pine chips, fresh 5-10 mm thickness, 20-60 mm length. | 42 |
| Pine shavings, stored 8 months, 2-3 mm thickness, 20-80 mm length. | 21 |
| Pine shavings, fresh, 2-3 mm thickness, 20-80 mm length. | 46.4088398 |

TABLE 1 calculated process parameters for bio-oil(s) use.

| | | |
| --- | --- | --- |
| Yield of bio-oil(s) wet basis | 0.24 | kg oil/kg wet chips |
| Yield of bio-oil(s) dry basis | 0.44 | kg oil/kg dry chips |
| Energy supplied by oil | 21260 | kJ/kg |
| Oil required to dry 1 kg of wood | 0.11 | kg |
| Calorific analysis of bio-oil(s). | | |

TABLE 1-continued calculated process parameters for bio-oil(s) use.

Charcoal yield vs bio-oil(s) yield

| Mass of fresh chips ($m_{wet}$) | Moisture content ($x_{moisture}$) | Charcoal ($m_{char}$) | Distillate | Tar produced ($m_{oil}$) |
| --- | --- | --- | --- | --- |
| kg | kg water/ kg wet chips | kg | kg | kg |
| 6 | 46.00% | 1.8 | 1.84 | 1.44 |

| Mass of dry chips ($m_{dry}$) | Condensate | Yield of bio oil ($x_{oil/dry}$) | Yield of bio oil ($x_{oil/wet}$) |
| --- | --- | --- | --- |
| kg | kg | kg oil/ kg dry chips | kg oil/ kg wet chips |
| 3.24 | 0.71 | 0.44 | 0.24 |

$m_{dry} = m_{wet} - (m_{wet} \times x_{moisture})$
$m_{oil} = m_{dry} - m_{char}$
$x_{oil/dry} = m_{oil}/m_{dry}$
$x_{oil/wet} = m_{oil}/m_{wet}$ Energy to dry the chips basis of 1 kg of wet chips

| Specific heat of water | Latent heat of water | Energy supplied by oil | mass of water ($m_{water}$) | Energy required to dry (Q) | Amount of oil required ($M_{oil}$) |
| --- | --- | --- | --- | --- | --- |
| kJ/kg K | kJ/kg | kJ/kg | kg | kJ | kg |
| 4.138 | 21260 | | 0.46 | 1192 | 0.11 |

$Q = C_p \times m_{water} \times \Delta T + (H_{vap} \times m_{water})$
$M_{oil} = (Q_{req}/H_{comb}) \times \eta$ Activated Carbon Microwave energy differs from usual source of heat in that it supplies the energy directly at the molecular level, and it is particularly good at activating water. The application of suitable power levels of microwave energy leads to steam being formed during the pyrolysis of wood to be at a sufficiently high temperature that it activates the charcoal as it formed. Further, we have found that as initial pyrolysis forms, a coating of electrically conductive carbon forms on the interior walls of the reaction container. When this happens, the biomass also becomes embedded in an intense black body radiation field, which assists in activating the carbon.

Microwave energy provides energy throughout the body of the biomass, as absorption tends to be modest and hence such radiation can travel through a considerable amount of biomass before it is absorbed. It is absorbed strongly by water, which has the effect of rapidly creating the initial pore structure, however once dehydrated, microwave absorption falls away.

Microwaves are, however, strongly absorbed by electrically conductive materials, and we have found that this gives us a route through the zone of dry biomass to a layer of electrically conductive charcoal on the interior of the reaction container. As tars are given off the biomass, some settle on the interior of the reaction container, whereupon they are pyrolysed to charcoal to form the layer of electrically conductive charcoal on the interior of the reaction container. Once the charcoal becomes electrically conductive, the charcoal strongly absorbs microwave energy and become red to yellow hot, and thus generate a field of intense black body radiation. Such black body radiation rapidly converts the outer parts of particles to charcoal, at which time the charcoal particles become electrically conductive and strongly absorb microwaves, which in turn rapidly promotes the conversion of the biomass to charcoal.

Figure 5:
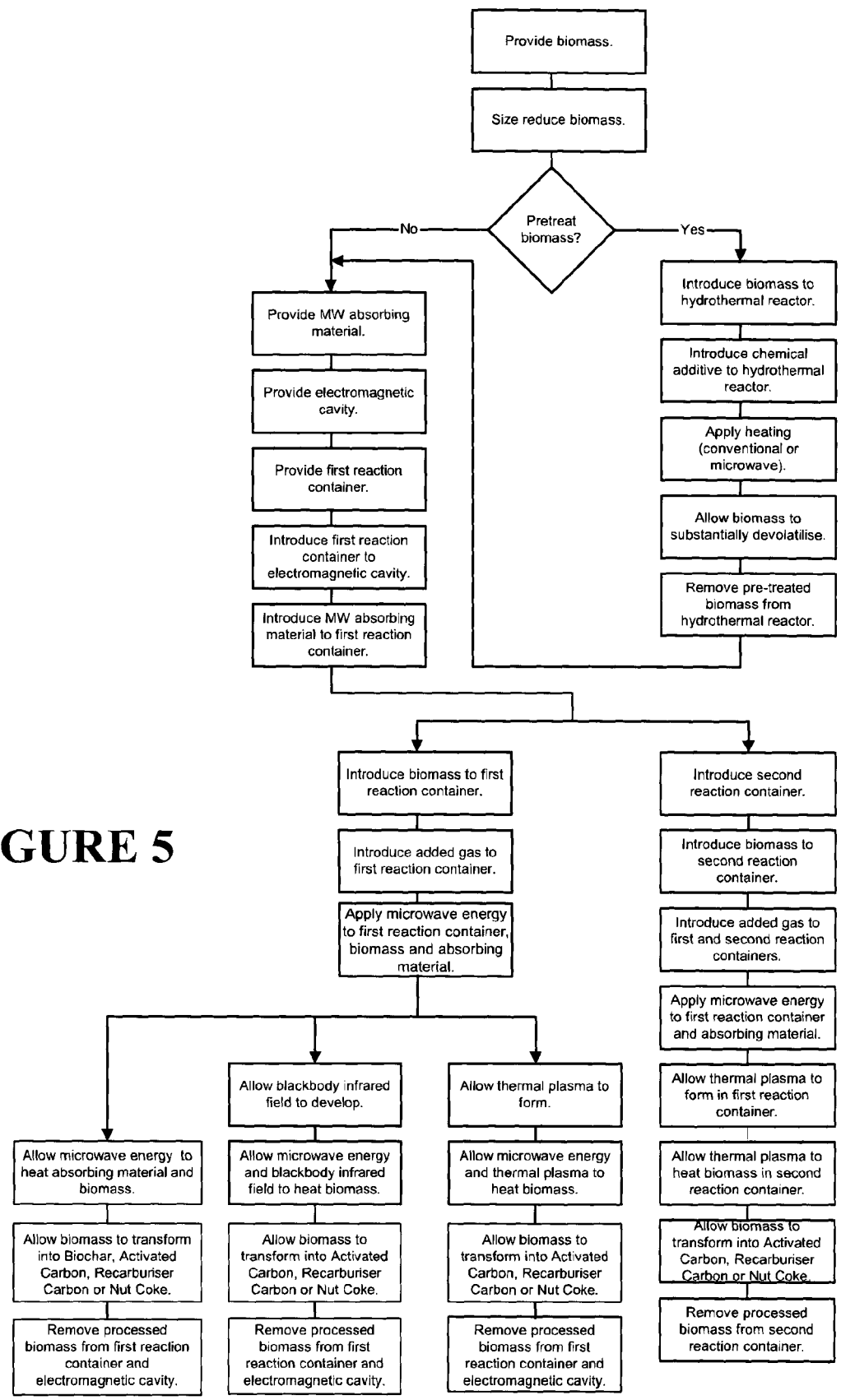
FIG. 5 flow diagram of the preferred embodiment methods of the invention.

Second Preferred Method:

A second preferred method of processing biomass will now be described with reference to FIG. 5. FIG. 5 shows each of the options for processing the biomass following the second, third and fourth preferred methods described herein.

The first step is to provide biomass 108. The next step is to provide an electromagnetic cavity 3 that is adapted to enclose and contain a field of electromagnetic energy. The next step is to provide a reaction container 5. The next step is to charge the reaction container 5 with biomass 108.

The biomass 108 is preferably size-reduced to a form that is easily handled, and the choice of size is for convenience. In the experiments described below, we have used sawdust. However, it will be appreciated that any finely divided lignocelluloses material is suitable. Sawdust was chosen in the experiments largely for convenience.

The biomass does not have to be dry, however the wetter it is, the more energy is expended in driving off water. The electromagnetic cavity, 3 and the reaction container 5 may be any shape; however, a cylindrical vessel is likely to be more convenient.

The next step is to apply electromagnetic energy to the electromagnetic cavity 3, reaction container 5 and the biomass 108 received therein. Preferably, the frequency of the electromagnetic energy is generated by the microwave generator 7 is within the electromagnetic spectrum of microwave frequencies. The electromagnetic energy is transmitted through a waveguide/electromagnetic cavity partition plate 106a into the electromagnetic cavity 3 and reaction container 5 by the waveguide 9 from the generator 7.

The biomass 108 receives direct electromagnetic energy and as a result of the direct electromagnetic energy, an indirect black body radiation field is produced. The biomass 108 is exposed to the indirect, black body radiation field while the direct electromagnetic energy is simultaneously applied to the biomass 108 such that activated carbon is formed from the biomass 108.

The interior of the reaction container 5 need not be cleaned, as pyrolysis products, such as char on the interior surface of the reaction container 5 promotes the heating of the biomass 108. In one embodiment, the reaction container 5 could be initially given a light graphite coating.

The direct electromagnetic energy is applied to the biomass 108 at power levels such that as pyrolysis products form, the pyrolysis products form a layer on the interior of the reaction container 5. When the direct, electromagnetic energy is applied to the layer of pyrolysis products, the layer becomes an electrically conducting layer which strongly absorbs microwaves and provides a black body radiation field. In an alternative embodiment, the method comprises applying a layer of carbon to the walls of the reaction container 5. For example, by painting or spraying a layer comprising graphite onto the walls of the reaction container.

During processing, the biomass 108 may be either stationary (batch mode) or moving (continuous); the requirement is that it has a chosen residence time in the energy field. We have obtained our best results when the energy field is stable, and such stability is most easily obtained when the infrared heat (black body radiation) comes from a electrically conducting carbon layer on the interior of the reaction container 5. Higher power loads permit the generation of a plasma. The plasma may form in addition to the black body radiation field produced from the electrically conducting layer. The plasma provides a radiation field to the biomass 108. The plasma forms when there are molecules in the gas phase that can absorb sufficient microwave power to be ionized, at which point, being electrically conducting species, they facilitate the further absorption of microwave power. As the charcoal becomes electrically conducting, it also becomes hot.

The biomass 108 is exposed to the energy fields for a period of time such that a maximum yield of activated carbon is formed, the time depending the ratio of power levels to the mass of carbon-containing material. The power levels are chosen such that the temperature of the carbon containing material is raised to suitable temperatures.

The temperature of the activated carbon formation is between 450° C. to 1300° C., preferably between 550° C. to 900° C., the temperature being controlled through the applied rate of electromagnetic energy. We have found that the power levels should be adjusted to ensure that the charcoal in this phase reaches at least 600° C. and desirably it should not exceed 900° C., while the time is chosen to maximise the production of charcoal. This time has to be determined by experiment for a given raw material. The lower temperature is to ensure that the charring proceeds at a reasonable rate. The upper range is nominated because the higher the temperature, in many gases the more charcoal is lost to oxidation. Too short of a time and the charcoal is inferior, while too long a time leads to reduced yields.

The heating time is dependent on the power to mass ratio of carbon-containing material, which can be between about 1 minute to about 5 hours, but is preferably between about 10 minutes and about 1 hour.

In an embodiment, the method further comprises replacing the air within the reaction container 5 with an added gas. The apparatus also has a system for removing and collecting bio-oil(s) emitted in vapour or gaseous form. In particular, the apparatus may have a vapour/gas extraction system that may include a source of carrier gas, in the form of a pressurised container 47, a condenser 65, and pressure regulators (not shown). The pressurised container 47 may provide the interior of the reaction container 5 with a carrier gas. The added gas flows across the biomass 108 and is removed through an exit tube, at the same time removing volatiles that are produced as a result of applying electromagnetic energy to the biomass 108. The added gas is supplied to the reaction container 5 at a specified flow rate. We believe a slightly oxidising gas is desirable to ensure that partially blocked pores of the biomass are cleared, and carbon dioxide is useful for this.

Adventitious water generated during pyrolysis will also function as such an oxidizing agent, particularly if there is no gas flow, however we found it easier to control the product with a gas flow. Small amounts of steam could also be introduced into the added gas, but carbon dioxide is preferred. The flow rate of carbon dioxide may be specified to control the pressure within the reaction container 5 as well as the rate of removal of bio-oil as opposed to the deposition of pyrolytic carbon on the walls of the reaction container 5. The method may further comprise condensing bio-oil(s) emitted from the biomass 108 as a result of applying electromagnetic energy to the biomass in vapour form into condensate. In an embodiment, the condensate is collected in a suitable container associated with a gas condenser.

The method further comprises ceasing exposing the charcoal so formed to the microwave energy. After the desired time, the charcoal is removed and, apart from standard treatments to get a batch with uniform particle sizes, the charcoal is ready to use.

With reference to FIGS. 7 to 10, a second preferred apparatus and method will now be described. Unless described below, the second preferred apparatus method is similar to the first preferred apparatus and method.

The apparatus shown in FIGS. 7 to 10 has a reaction container 5, which is surrounded by refractory materials 101. The reaction container is a high purity fused-silica, high purity alumina or alumino-silicate tube having an outer diameter of about 70 mm compared to the diameter of the reaction container e in the first preferred embodiment, which is about 150 mm. Suitable refractory materials include thermal ceramics with low dielectric loss characteristics such as Kaowool® alumino-silicate fibre, Fibrefrax® aumino-silica fibreboard and Isolite (brand) alumino-silicate fire bricks, for example.

In an embodiment the dielectric constant of the refractory materials that surround the reaction container will be high enough to reduce the electric field strength in the refractory materials and increase (concentrate) the electric field within the reaction container.

The apparatus has a system for introducing and removing gas. The added gas is introduced at an injection port 103 and removed at an outlet port 105. The inlet and outlet ports are preferably fused silica tubes. The apparatus also has a waveguide interface flange 106d (bolts to the waveguide 9, FIG. 1), a waveguide/electromagnetic cavity partition plate 106a in the form of a fused-silica or alumina disc with a clearance 106c between the disc 106a and the reaction container 5. A mechanical seal 107 is provided at the outlet port 105.

Third Preferred Method:

In the third preferred method, biomass 108 is introduced to the reaction container 5. When microwaves are applied to the electromagnetic cavity 3, the waves will have positions of destructive interference (nodal positions) and positions of constructive interference (antinodal positions). Corresponding nodal and anti-nodal positions are also setup within the reaction container 5. In the second preferred method, a microwave absorbing material 109 (such as silica carbide, graphite or activated carbon) is provided at an anti-nodal position inside the reaction container such that the microwave absorbing material is strongly coupled to the electromagnetic field and is directly heated by the electromagnetic field.

An added gas is introduced to the reaction container through the injection port 103 and flows in the direction indicated by arrows labelled in FIG. 7. The added gas is preferably any gas that does not react significantly with carbon under the conditions, or that reacts only slowly at elevated temperatures. Examples of such inert gases include, but are not restricted to, nitrogen, argon, neon and helium. Examples of mildly reactive gases include carbon dioxide. Microwaves are applied to the reaction container and the microwave absorbing material at power levels such that the microwave absorbing material receives direct electromagnetic energy. Microwaves are applied to the reaction container in the direction labelled M in FIG. 7. By thermal conduction, the microwave absorbing material 109 heats the added carrier gases flowing through the reaction container. In addition, heating of the gases leads to partial ionization of the gases following which the gas phase becomes electrically conductive. The electromagnetic field couples to the electrically conductive gas phase initiating a plasma 111. The plasma 111, once initiated, is sustained if a gaseous medium is present and the appropriate amplitude of electromagnetic field is maintained inside the reaction container 5. The plasma 111 provides a black body radiation field and the biomass is exposed to the black body radiation field such that activated carbon or recarburiser carbon is formed from the biomass. The added gas flows across the biomass and is removed through an exit tube 105, at the same time removing volatiles 113 that are produced as a result of applying electromagnetic energy to the biomass. The microwave absorbing material 109 is exposed to the electromagnetic field for the duration of the biomass 108 conversion process. Alternatively, the microwave absorbing material 109 is electrically shielded from the electromagnetic field after initiation of a plasma 111. In this alternative method, the plasma 111 heats the incoming carrier gas sufficiently to ionize the gas, following which the gas phase becomes electrically conductive. The onset of electrically conductive species greatly enhances the further absorption of microwave energy, further enhancing plasma 111 generation. In this alternative method, electromagnetic energy used initially to heat the microwave absorbing material 109 is available to enhance the plasma 111 intensity.

The intensity and position of the plasma 111 is controlled by adjusting the amplitude of electromagnetic field and flow rate of the added carrier gas. Increasing the amplitude of the electromagnetic field generates more energetic species and the resulting plasma expands to fill a greater proportion of the reaction container volume. By increasing the flow rate of the added carrier gas, the plasma extends away from the points of origin toward the gas exit port 105. The amplitude of electromagnetic field and flow rate of added carrier gas are adjusted such that the plasma comes into contact with the biomass 108 located downstream from the added gas injection port 103 and the microwave absorbing material 109.

In addition to heat conducted by the biomass 108 from the plasma 111, heat is generated volumetrically within the biomass 108 through interaction of the residual electromagnetic field not absorbed by the microwave absorbing material 109 with polar molecules, ions and free electrons present in the biomass 108.

The biomass 108 is positioned inside the reaction container 5 at an electromagnetic wave anti-nodal position.

With reference to FIGS. 5, and 7 to 11, a third preferred method will now be described. Unless described below, the third preferred method is similar to the first and second preferred methods. In the third preferred method, a second reaction container 205 is connected to the outlet end of the first reaction container 5 via mechanical seal 107. Biomass 108 is provided to the second reaction container 205. The gas outlet tube 105 connects to the second reaction container 205 via gland 207.

The microwave absorbing material 109 is positioned at an electromagnetic wave anti-nodal position. Preferably the microwave absorbing material 109 is positioned at the first anti-nodal position 200 or second anti-nodal position 201 relative to the electromagnetic cavity short circuit termination end plate 206. Alternatively microwave absorbing materials are positioned at the first anti-nodal position 200 and the second anti-nodal position 201 relative to the position of the electromagnetic cavity short circuit termination end plate 206.

In an embodiment the short circuit end plate may be replaced with a load with characteristic impedance equivalent to that of the waveguide. This will eliminate the standing wave and normalise the field strength along the length of the reaction container.

Fourth Preferred Method

In the fourth preferred method, a second reaction container 205 is connected to the outlet end of the first reaction container 5 via mechanical seal 107. Biomass 108 is provided to the second reaction container 205. The gas outlet tube 105 connects to the second reaction container 205 via gland 207.

The mechanical seal 107 is preferably metallic, cylindrical and hollow and has an internal diameter below the cut-off frequency of the electromagnetic field oscillation, which attenuates the amplitude of the electromagnetic field preventing electromagnetic heating of the biomass 108 that resides within the second reaction container 205. The mechanical seal 107 and is fitted to the electromagnetic cavity short circuit termination plate 206 such that it makes electrical contact around it circumference. The mechanical seal has length 202 to attenuate the electromagnetic field sufficiently so that the biomass does not heat when electromagnetic power is applied to the electromagnetic cavity 5.

The second reactor container has a diameter of about 40 mm and is preferably made from high purity fused silica or high purity alumino-silicate.

The amplitude of the electromagnetic field and flow rate of the added gas are adjusted until the plasma is forced through the exit of the first reactor container 5, through the mechanical seal 107 and into the second reactor container 205 that contains the biomass 108 . . . . The plasma then comes into direct contact with the biomass 108, rapidly heating the biomass 108 by conduction. Volatiles produced from the biomass 108 flow through the second reactor container 205 into the gas outlet tube 105. A difference between the fourth preferred method and the third preferred method is that the biomass is not exposed to microwave energy, which provides a greater level of temperature control and control over the chemistry between the plasma and biomass.

A difference between the fourth preferred method and the third preferred method is that the biomass 108 is not exposed to the electromagnetic energy so that the biomass 108 does not absorb electromagnetic energy not absorbed by the microwave absorbing material 109. In this method, pyrolysis products generated by the biomass 108 are prevented from forming an electrically conductive layer on the reactor container 5 walls (as described in the first aspect of the invention) and absorbing energy from the electromagnetic field, which allows more power for the plasma 111.

Preferred Pre-Treatment Method

In the preferred pre-treatment method, size reduced biomass is pre-treated by hydrothermal conversions using a high pressure batch reactor, as shown in FIG. 12. The batch reactor is a conventional reactor having a body 301, a ceramic heater 303, a coiling coil 305, a thermowell 307, a clamp 309, water cooled adapters 311, 313, a pressure sensor 315 with associated pressure gauge 317, and gas inlet valves.

Biomass pre-treatment is carried out:
i) To normalise the basic composition and structure of the biomass.
ii) To reduce the amount of volatile-matter that is released into the microwave reactor during microwave and plasma heating.
iii) To effectively deoxygenate the biomass.
iv) To partially carbonise the biomass and increase electrical conductivity thus increasing microwave susceptibility.
v) To avoid the need to first dry the biomass prior to carbonisation as is usually required when treating biomass under dry pyrolysis conditions.
vi) Capture volatile organic compounds into the aqueous reaction medium, which can be further processed/treated by fractional distillation or anaerobic digestion to separate wanted compounds from unwanted compounds.

Hydrothermal pre-treatment involves heating raw sized-reduced biomass in water under autogenous high pressure and temperature (at the lower region of the hydrothermal liquefaction process) so that the biomass becomes torrefied.

Under hydrothermal conditions water acts as a powerful organic solvent, which enables organic compounds to solubilize, and achieve their reactions in an homogeneous medium. In this method the chemical reactor is heated with a conventional resistive electric heating element. In an embodiment the hydrothermal reactor contents may be heated with microwave energy to accelerate heating of the reagent and biomass and to reduce the residence time. The biomass is heated to a temperature between 230° C. and 350° C. under saturated pressure between 25 and 170 Bar for about 30 minutes to 2 hours.

A small amount of acid catalyst is added to the biomass and reagent prior to hydrothermal treatment in order to enhance biomass degradation, lower residence times. This also promotes the removal of oxygen from the biomass and formation of fixed carbon. Oxygen extracted from the biomass in this way will promote the formation of water molecules. If an acid catalyst is not used, oxygen in the biomass will more likely form Carbon monoxide gas, thus reducing the amount of fixed carbon retained in the end product.

During hydrothermal treatment many of the volatile components in the biomass are removed from the biomass along with some inorganics.

Pre-treated biomass is removed from the hydrothermal reactor and mechanically pressed to remove excess free water (left over reagent) and possibly some organic liquid from condensed vapours. During the dewatering process additional volatile and mineral material is washed off the biomass and recovered.

The left over reagent water and water collected during pressing are treated and recycled for the next hydrothermal pre-treatment.

Nutrient matter collected during water treatment is returned to the soil.

The pre-treated biomass will have a fixed Carbon content typically between about 64% to 82% dry ash-free basis.

Sufficient polar species are retained in the pre-treated biomass to enable adequate (second stage) microwave coupling with the biomass during the heat-up phase. The amount of polar species retained in the pre-treated biomass is less than that required to sustain a thermal plasma.

The partially dried hydrothermally pre-treated biomass is then placed into the microwave reaction container and processed using the second preferred method described above. It will be appreciated that the pre-treatment process may be used before any of the other preferred methods described above.

Outputs

The main output of the method of this invention is activated carbon, which has widespread use as an adsorbent for purifying solutions and gas streams. Additional outputs may include recarburiser carbon metallurgical nut coke, biomass pyrolysis oils, of interest for making bio-oils, and possibly carbon monoxide in the gas stream.

Discussion of Examples

The examples below show that quality activated carbon, with a good surface area, can be made relatively quickly with microwave power application provided that the additional heating from the glow forming on the interior of the reaction container 5 is present. Not shown in the examples are the results of sawdust treated with microwaves where this effect was not present. A typical sample of such char that did not have such glow present had a surface area of 0.46 $m^2$/gram, i.e. the presence of the glow treatment increased the surface area by two orders of magnitude.

In addition to black-body radiation from such an electrically conductive surface, we have found that a plasma can form, in which case the plasma will also provide the required radiation field. This appeared to have occurred in example 1. There may also be some direct heating from the plasma. While discussing the further examples, plasmas may have formed, but our invention is dependent on the formation of the activated carbon based on the formation of a glowing radiation field, and not on the exact nature of said field.

When carbon soaked in heavy pyrolytic tars was similarly treated, a good yield of activated carbon was found, although the surface area was somewhat lower than in the other runs. Nevertheless, a cheaper slightly lower-grade carbon will have uses, and more importantly, this is a good use for tars that are otherwise difficult to use.

That the orange heat glow was caused by the carbon on the interior of the reaction container is evidenced by the fact that while in example 1 it took quite some time to establish, and in a number of previous runs it did not establish at all, leading only to inferior product, once established, provided the reaction container was not cleaned, the glow commenced very rapidly in the following runs.

If the third example is taken as a reference, prolonging the time at lower power may or may not make improved activated carbon, but it runs the risk of lower yields. Longer time at high power levels produces no carbon, at least if carried out in the presence of carbon dioxide. This will be because carbon dioxide is a mild oxidizing agent. This is desirable for making activated carbon, in that it helps clear out pore blockages, but while it is improving the quality of the activation, it is also ablating away carbon. For a certain time, the improvements are worth the loss of yield, but after that critical time, further exposure simply costs yield.

The optimum would appear to be power levels appropriate to form a yellow-orange glow, for a time that maximises yield/activity. That will vary to some extent on the actual configuration of the apparatus, and on the nature of the biomass.

Examples

Example 1

Sawdust (50 g) was placed in a clean quartz reaction container, and carbon dioxide was passed over it at a rate of 40 L/min. The absorbed microwave energy was initially 3 kW.

After about 6 minutes, during which time the temperature of the sawdust was 305° C., what we believe to be a plasma formed, together with a deep orange heat glow that commenced on the inside of the quartz, which was sustained for a brief period following the power being turned off. During this period, power absorption was 7.6 kW and the temperature reached 871° C. At the end of 20 minutes, 6 g of charcoal was obtained, which had a surface area of 705 m$^2$/gram.

Example 2

Sawdust (50 g) impregnated with 35 g of heavy pyrolysis tar was placed in a quartz reaction container, the inner surface of which was coated with carbon from previous runs, and carbon dioxide was passed over it at a rate of 40 L/min. The absorption of microwave energy was initially 5 kW, which subsequently rose to 7 kW following intermittent plasma formation and the orange surface glow. The temperature reached 756° C. At the end of 20 minutes, 12 g of charcoal was obtained, which had a surface area of 446 m$^2$/gram.

Example 3

Sawdust (50 g) was placed in a quartz reaction container, the inner surface of which was coated with carbon from previous runs, and carbon dioxide was passed over it at a rate of 40 L/min. The orange glow appeared after about 1 minute, and microwave power was absorbed at 5 kW initially, and after 9 min, 6.5 kW. The applied power was then reduced to maintain 5 kW. At the end of 23 minutes, power ceased and 4 g of charcoal was obtained, which had a surface area of 637 m$^2$/gram.

Example 4

Sawdust (50 g) was placed in a quartz reaction container, the inner surface of which was coated with carbon from previous runs, and carbon dioxide was passed over it at a rate of 40 L/min, and microwave energy was absorbed at 5 kW for 46 minutes. The orange glow commenced after about 2 minutes. The temperature was 590° C. at the end of the run, but this may not have been the maximum temperature. At the end of 46 minutes, 2 g of charcoal was obtained, which had a surface area of 797 m$^2$/gram.

Example 5

Example 4 was repeated, except that the absorbed power increased to 8.2 kW to 9 kW by increasing the applied power. The temperature reached over 910° C., and the yield of charcoal was 0 g.

Table 1 below lists the specification for recarburiser carbon used by New Zealand steel in the manufacture of steel together with results for carbon produced by using the first preferred apparatus shown in FIGS. 1 to 3. Table 2 below lists corresponding results for carbon produced using the apparatus shown in FIGS. 5 to 8.

TABLE 1

| Sample ID | Feedstock | Carbon (%) | Hydrogen (%) | Nitrogen (%) | Sulphur (%) | Gross Heating Value (MJ/kg) | Moisture Loss (%) |
| --- | --- | --- | --- | --- | --- | --- | --- |
| Specification for recarburiser carbon | | >88.0 | <1.0 | <1.0 | <0.4 | >30.0 | <2.0 |
| R24/1a | Flame Coal | 90.4 | 1.1 | 1.7 | <0.3 | 32.4 | NA |
| R28/4 | Flame Coal | 90.1 | 0.7 | 0.3 | 1.6 | 32.0 | NA |

TABLE 1-continued

| Sample ID | Feedstock | Carbon (%) | Hydrogen (%) | Nitrogen (%) | Sulphur (%) | Gross Heating Value (MJ/kg) | Moisture Loss (%) |
|---|---|---|---|---|---|---|---|
| R25/1a | Flame Coal | 88.8 | 1.7 | 1.7 | 0.7 | 32.7 | NA |
| Before treatment | Flame Coal | 73.7 | 5.8 | 1.3 | <0.4 | 34.0 | Flame Coal |

The feedstock for each of the experiments in Table 1 was sub-bituminous flame coal. The last row of Table 1 shows the properties of the flame coal before treatment.

TABLE 2

| Sample ID | Feedstock | Carbon (%) | Hydrogen (%) | Nitrogen (%) | Sulphur (%) | Gross Heating Value (MJ/kg) | Moisture Loss (%) |
|---|---|---|---|---|---|---|---|
| Specification for recarburiser carbon | | >88.0 | <1.0 | <1.0 | <0.4 | >30.0 | <2.0 |
| R31/3 | Radiata Pine | 95.7 | <0.3 | <0.4 | <0.3 | 33.2 | <0.3 |
| R31/3 (Before treatment) | Radiata Pine | 56.6 | 6.4 | <0.3 | <0.3 | 28.7 | ~15.0 |
| R33/2 | Flame Coal | 94.9 | <0.3 | 0.8 | 1.4 | 33.0 | 1.1 |
| R33/2 (Before treatment) | Flame Coal | 73.7 | 5.8 | 1.3 | <0.4 | 34.0 | NA |

The feedstock for each of the experiments in Table 2 was either *radiata* pine woodchips or sub-bituminous flame coal. The second row of Table 2 shows the properties of the woodchips before treatment and the last row of Table 2 shows the properties of the sub-bituminous flame coal before treatment.

Table 3 below shows the treatment conditions together with results from the treatment of biomass to produce activated carbons from imported and locally grown hickory hardwood and locally grown walnut shell feedstocks. Properties of the hickory biomass are shown at the end of the results table. Properties of the walnut are not available but it is generally accepted that the solid density of walnut shell is higher than hickory and has a finer internal porous structure.

Treatment temperatures between 600° C. and 1000° C. were selected across all treatments, the upper temperature limit being imposed by the measurement range of the infrared temperature sensors. Pressure for all treatments was slightly above atmospheric at about 25 mm H20.

Runs 43 to 46 involved the use of Silica Carbide microwave-absorbing catalyst to promote rapid heating of hickory feedstock. Samples were heated toward the target temperature and then heating switched off. No 'holding time' at a certain temperature or within a certain temperature range was applied. Total microwave heating time ranged from 7 to 13 minutes and corresponding temperatures ranged from 410° C. to 912° C.

Runs 47 to 62 were also treatments of hickory feedstock but microwave-absorbing catalyst was not used. In these treatments hold times at the target temperatures ranged from 3 minutes to 15 minutes to allow time for a porous structure to evolve in the carbons.

Runs 63 to 65 were treatments of walnut shell. In these treatments microwave-absorbing catalyst was not used. Holding times at the target temperature for 0 for Runs 63 and 64. A long hold time of 20 minutes for Run 65 was selected to test the limits of the apparatus at high temperature.

For all treatments a thin layer of pyrolytic carbon was present on the inner surface of the reaction container. This layer is susceptible to microwave energy and thus provided a blackbody radiation field to the biomass, assisting heating and activation.

Specific surface areas of the activated carbons determined by the B.E.T (N2) method ranged from 170 m$^2$/g to 629.8 m$^2$/g and averaged 550.7 m$^2$/g across Runs 43 to 46.

Yields ranged 10% to 13% and averaged 12.5% across Runs 43 to 46.

Subsample L2 showed a lowest surface area of 170 m$^2$/g, yet it was treated at the highest temperature across the Run 43 to 46. The phenomena can be attributed to either insufficient temperatures for activation being reached in the specific location of the reaction container of L2, or thermal runaway in this location has force thermal re-ordering of the latent crystalline structure in the biomass i.e. the formation non-porous graphitic carbon.

Specific surface areas of the activated carbons determined by the B.E.T (N2) method ranged from 82.3 m$^2$/g to 931 m$^2$/g and averaged 509 m$^2$/g across Runs 47 to 62. Yields ranged 7% to 13% and averaged 16% across Runs 47 to 62. If out lying sub sample L2 is not included in the assessment across Runs 47 to 62 the average surface area achieved increases to over 600 m$^2$/g.

Specific surface areas of the activated carbons determined by the B.E.T (N2) method ranged from 531 m$^2$/g to 1276 m$^2$/g and averaged 904 m$^2$/g across Runs 63 to 65. Yields ranged 8% to 20% and averaged 15% across Runs 63 to 65.

TABLE 3

| Run ID (standardised) | Feedstock | Carrier/ Purge Gas | Gas Flow (LPM) | Average Absorbed Power (kW) | Peak Absorbed Power (kW) | MW Absorber Mass (g) |
|---|---|---|---|---|---|---|
| R43 | Hickory | $CO_2$ | 40 | 2.09 | 2.6 | 35 |
| R44 | Hickory | $CO_2$ | 40 | 2.34 | 2.5 | 35 |
| R45 | Hickory | $CO_2$ | 40 | 2.47 | 2.6 | 35 |
| R46 | Hickory | $CO_2$ | 40 | 2.68 | 3.6 | 35 |
| R47 | Hickory | $CO_2$ | 40 | 2.74 | 3.1 | 0 |
| R55 | Hickory | $CO_2$ | 35 | 2.26 | 2.9 | 0 |
| R56 | Hickory | $CO_2$ | 35 | 2.63 | 2.8 | 0 |
| R57 | Hickory | $CO_2$ | 35 | 2.31 | 2.8 | 0 |
| R58 | Hickory | $CO_2$ | 35 | 2.58 | 2.8 | 0 |
| R59 | Hickory | $CO_2$ | 35 | 2.48 | 2.9 | 0 |
| R60 | Hickory | $CO_2$ | 35 | 2.34 | 2.9 | 0 |
| R61 | Hickory | $CO_2$ | 35 | 2.54 | 2.9 | 0 |
| R62 | Hickory | $CO_2$ | 35 | 2.68 | 3.3 | 0 |
| R63 | Walnut | $CO_2$ | 35 | 2.99 | 4 | 0 |
| R64 | Walnut | $CO_2$ | 35 | 3.35 | 4.4 | 0 |
| R65 | Walnut | $CO_2$ | 35 | 4.09 | 5.2 | 0 |

| Run ID (standardised) | Heat-up Time (Min) | Hold Time (Min) | Total Heating Time (min) | Target Temp (° C.) | Average Temp (° C.) | Peak Temp (° C.) | Solids Start | Solids Remaining | Yeild |
|---|---|---|---|---|---|---|---|---|---|
| R43 | 7 | 0 | 7 | 600 | 337 | 410 | 30 | 4 | 13% |
| R44 | 6 | 0 | 6 | 700 | 397 | 680 | 30 | 4 | 13% |
| R45 | 4 | 0 | 4 | 700 | 358 | 665 | 30 | 4 | 13% |
| R46 | 13 | 0 | 13 | 900 | 676 | 912 | 30 | 3 | 10% |
| R47 | 10 | 0 | 10 | 700 | 434.3 | 683 | 30 | 2 | 7% |
| R55 | 12 | 3 | 15 | 700 | 704 | 720 | 100 | 18.65 | 19% |
| R56 | 16 | 3 | 19 | 700 | 702 | 702 | 100 | 17.9 | 18% |
| R57 | 17 | 3 | 20 | 700 | 459 | 701 | 100 | 18.44 | 18% |
| R58 | 11 | 3 | 14 | 700 | 422 | 702 | 100 | 19.33 | 19% |
| R59 | 16 | 3 | 19 | 700 | 493 | 702 | 100 | 18.05 | 18% |
| R60 | 15 | 3 | 18 | 700 | 489 | 705 | 100 | 16.89 | 17% |
| R61 | 16 | 6 | 22 | 700 | 529 | 702 | 100 | 17.61 | 18% |
| R62 | 33 | 15 | 48 | 900 | 756 | 903 | 100 | 10.33 | 10% |
| R63 | 32 | 0 | 32 | 900 | 451 | 637 | 100 | 19.98 | 20% |
| R64 | 97 | 0 | 97 | 1000 | 631 | 837 | 201 | 36.21 | 18% |
| R65 | 71 | 20 | 91 | 900 | 743 | 947 | 190 | 15.34 | 8% |

| Run ID (standardised) | Sub Samples Tested | BET ($m^2/g$) | Langmuir ($m^2/g$) | C | H | N | S |
|---|---|---|---|---|---|---|---|
| R43 | E2 | 634.0 | 710.0 | | | | |
| R43 | E3 | 482.7 | 539.9 | | | | |
| R44 | H1 | 680.0 | 759.8 | | | | |
| R44 | H2 | 619.6 | 692.1 | | | | |
| R45 | J1 | 692.8 | 773.8 | | | | |
| R45 | J2 | 508.8 | 568.0 | | | | |
| R46 | L1 | 618.0 | 689.5 | | | | |
| R46 | L2 | 170.0 | 170.0 | | | | |
| R47 | N1 | 931.0 | 1,040.0 | | | | |
| R47 | O1 | 841.0 | 939.0 | | | | |
| R55 | R55.1b | 82.3 | 92.1 | | | | |
| R56 | R56.0b | | | 87.7 | 2.02 | 0.46 | <0.01 |
| R56 | R56.1b | 372.0 | 414.9 | | | | |
| R59 | R59.0b | | | 89.9 | 1.76 | 0.30 | <0.01 |
| R59 | R59.1b | 396.2 | 435.7 | | | | |
| R60 | R60.0b | | | 88.8 | 1.75 | 0.18 | <0.01 |
| R61 | R61.1b | 428.1 | 476.9 | | | | |
| R62 | R62.0b | | | 91.2 | 0.71 | 0.71 | 0.03 |
| R62 | R62.1b | 497.4 | 555.2 | | | | |
| R63 | R63.0b | | | 86.9 | 1.33 | 0.41 | 0.02 |
| R63 | R63.0c | 531.7 | 592.8 | | | | |
| R65 | R65.0b | | | 84.9 | 2.52 | 0.36 | 0.02 |
| R65 | R65.1c | 1,276.9 | 1,427.6 | | | | |

TABLE 3-continued

| | C | H | N | S | O | Moisture (% wt.) | Volatile Matter (% wt.) | Ash (% wt.) |
|---|---|---|---|---|---|---|---|---|
| Hickory feedstock before treatment | 46.4 | 5.59 | 0.08 | 0.02 | 40.80 | 6.30 | 79.80 | 0.80 |

Table 4 below shows the treatment conditions together with results from the pre-treatment of biomass using the preferred pre-treatment method. Biomass was *radiata* pine in all pre-treatments and the water to biomass ratio of 5:1 was selected to ensure satisfactory convective mixing throughout the reaction medium. The last row of the results table shows the properties of the biomass before pre-treatment.

The pre-treatment campaign demonstrated that reaction temperature had a strong effect on the level of carbonisation. A biomass pre-treatment temperature of about 270 C is sufficient to raise the Carbon content of the biomass by 27% in about 1-hour to over 70% C. Doubling the treatment time to 2 hours raised the Carbon content marginally by only 1%.

TABLE 4

| Biomass | Radiata pine cross cut saw dust. |
|---|---|
| Particle size | 1 × 1-3 × 3 mm |
| Moisture content | 11% |
| Bulk density | 162 g/L |

TREATMENT CONDITIONS

| Trial | Mass feedstock (g) | Mass water (g) | Temp Setpoint ° C. | Pressure at Setpoint (Bar) | Time at Setpoint (Hours) |
|---|---|---|---|---|---|
| HR1 | Approx 40 | 200 | 230 | 25 | 2 |
| HR2 | 45 | 200 | 230 | 25 | 4 |
| HR3 | 40 | 200 | 230 | 25 | 3 |
| HR4 | 40 | 200 | 230 | 26.4 | 20 |
| HR5 | 40 | 200 | 235 | 24.7 | 3 |
| HR6 | 40 | 200 | 275 | 54.6 | 1 |
| HR7 | 40 | 200 | 275 | 55.9 | 2 |
| HR8 | 20 | 200 | 230 | 24.8 | 3 |
| HR9 | 10 | 206 | 230 | 24.7 | 3 |

RESULTS

| Solid Sample Tested | Elemental Composition (%) | | | | Calorific Value (MJ/kg) |
|---|---|---|---|---|---|
| | C | H | N | S | NHV |
| HR1.0 | 58.51 | 3.65 | <0.3 | <0.3 | Not tested |
| HR2.0 | 62.40 | 2.33 | <0.3 | <0.3 | Not tested |
| HR3.1 | 59.84 | 3.59 | <0.3 | <0.3 | 24.9 |
| HR4.2 | 69.72 | 4.77 | <0.3 | <0.3 | 29.8 |
| HR5.8 | 67.36 | 3.51 | <0.3 | <0.3 | 27.4 |
| HR6.2 | 71.66 | 5.20 | <0.3 | <0.3 | 31.0 |
| HR7.11 | 72.23 | 5.22 | <0.3 | <0.3 | 31.2 |
| HR8.6 | 65.73 | 5.61 | <0.3 | <0.3 | 29.4 |
| HR9.11 | 64.26 | 5.62 | <0.3 | <0.3 | 28.94 |
| Feedstock Before Treatment | 56.6 | 6.4 | <0.3 | <0.3 | Not tested |

Table 5 below shows the target specification for Nut Coke used in the manufacture of steel together with results for hydrothermally pre-treated biomass that has been treated by microwave heating using the first preferred method.

The hydrothermally pre-treated biomass was *radiata* pine wood chips (25 mm×25 mm), which had an initial carbon content around 55%. Hydrothermal treatment was carried out at around 300 C for about 1-hour, which raised the carbon content above 76%. The electrical resistance of a subset of pre-treated biomass particles were measured. All were >2 k Ohms, which is not expected to couple strongly with microwave. The pre-treated biomass sample was then mixed with pieces of Silica Carbide (5 mm×5 mm) equivalent to 5% of the pre-treated biomass mass and treated with a net microwave heating power of about 400 W for about 5 minutes. The result demonstrates a significant increase in Carbon content of 11% after only a few minutes of microwave heating and a corresponding decrease in Sulphur and Nitrogen content.

TABLE 5

| Sample ID | Feedstock | C (%) | H (%) | N (%) | S (%) |
|---|---|---|---|---|---|
| Target Spec (Nut Coke) | | 85.0 | NS | <0.51 | <0.51 |
| C (Before MW treatment) | HTC Pine | 76.28 | 3.52 | <0.30 | <0.30 |
| G (After MW Treatment) | | 84.76 | 1.66 | <0.30 | <0.30 |
| Change | | 8.47 | −1.87 | <0.30 | <0.30 |

Key:
NA = Not Available
NS = Not Specified

Table 6 below shows the experimental conditions together with corresponding results from nut coke trials using the first preferred method. Properties of the feedstock are below the results table 7.

In all examples the feedstock used was hickory, the reaction container was fused quartz and the carrier gas Nitrogen.

No microwave absorbing catalyst was used during these treatments, however a fine layer of pyrolytic carbon lined the inner wall of the reaction container and thus provided a blackbody radiation field to the biomass to assist heating.

As can be seen the carbon content of the biomass was increased significantly across all treatments. Carbon content appears to have levelled off after only 3 minutes of heating time at the target temperature and averaged 89%, whereas nitrogen content appears to decrease with additional heating time.

The results demonstrate that a total heating time of around 15 minutes is sufficient to meet the target specification for Nut Coke

TABLE 6

| Run ID | Feedstock | Gas Flow (LPM) | Average Absorbed Power (kW) | Peak Absorbed Power (kW) | MW Absorber Mass (g) |
|---|---|---|---|---|---|
| R48 | Hickory | 25 | 2.10 | 2.1 | 0 |
| R49 | Hickory | 25 | 1.45 | 2.2 | 0 |
| R50 | Hickory | 25 | 1.60 | 2.3 | 0 |
| R51 | Hickory | 25 | 1.96 | 2.1 | 0 |

TABLE 6-continued

| | | | | | |
|---|---|---|---|---|---|
| R66 | Hickory | 25 | 1.23 | 2.1 | 0 |
| R67 | Hickory | 25 | 1.39 | 2.1 | 0 |
| R68 | NZ Grown Hickory | 25 | 1.33 | 2.3 | 0 |
| R69 | NZ Grown Hickory | 25 | 1.35 | 2.2 | 0 |

| Run ID | Heat-up Time (Min) | Hold Time (Min) | Total Heating Time (min) | Target Temp ° C. | Average Temp ° C. | Peak Temp ° C. |
|---|---|---|---|---|---|---|
| R48 | 11 | 3 | 14 | 600 | 431 | 600 |
| R49 | 12 | 5 | 17 | 600 | 429 | 603 |
| R50 | 14 | 7 | 21 | 600 | 446 | 603 |
| R51 | 11 | 3 | 14 | 600 | 390 | 607 |
| R66 | 10 | 20 | 30 | 600 | 542 | 680 |
| R67 | 8 | 20 | 28 | 600 | 518 | 680 |
| R68 | 11 | 20 | 31 | 600 | 555 | 682 |
| R69 | 10 | 20 | 30 | 600 | 483 | 688 |

| Run ID | Sample Tested | C | H | N | S | Solids Start (g) | Solids Remaining (g) | Yield |
|---|---|---|---|---|---|---|---|---|
| R48 | R48.0 | 90.9 | 2.3 | 0.3 | <0.01 | 101 | 20.08 | 20% |
| R49 | R49.0 | 90.3 | 1.7 | 0.5 | <0.01 | 100 | 20.8 | 21% |
| R50 | R50.0 | 90.8 | 2.0 | 0.4 | <0.01 | 100 | 20.44 | 20% |
| R51 | R51.0 | 89.3 | 2.6 | 0.3 | <0.01 | 100 | 21.04 | 21% |
| R66 | R66.0b | 90.2 | 1.5 | 0.4 | 0.02 | 150 | 25.35 | 17% |
| R67 | R67.0b | 90.4 | 1.4 | 0.1 | 0.02 | 150 | 27.35 | 18% |
| R68 | R68.0b | 86.0 | 2.0 | 0.2 | 0.01 | 150 | 33.38 | 22% |
| R69 | R69.0b | 87.1 | 1.6 | 0.2 | 0.01 | 150 | 33.51 | 22% |

TABLE 7

| | C | H | N | S | O | Moisture (% wt.) | Volatile Matter (% wt.) | Ash (% wt.) |
|---|---|---|---|---|---|---|---|---|
| Hickory feedstock before treatment | 46.4 | 5.59 | 0.08 | 0.02 | 40.80 | 6.30 | 79.80 | 0.80 |

The invention claimed is:

1. A method for processing biomass, the method comprising the steps of:
   a. pre-treating biomass using hydrothermal conversion, wherein the hydrothermal conversion is performed by heating the biomass in water at a temperature between about 230° C. and about 350° C. under a pressure of about 25 Bar to about 170 Bar; and
   b. applying electromagnetic energy to the pre-treated biomass.

2. The method as claimed in claim 1, wherein step (b) is performed by applying the electromagnetic energy to the pre-treated biomass to produce one or more of recarburiser carbon, a bio-oil(s), a gas(es), nut coke, and activated carbon.

3. The method as claimed in claim 1, wherein in step (a), the biomass is heated using microwave energy.

4. A method as claimed in claim 1, wherein the method yields a product selected from the group consisting of activated carbon, nut coke, and recarburiser carbon and the method further comprises the step of using the product to manufacture steel.

5. A method for producing one or more products selected from recarburiser carbon, charcoal, a bio-oil(s), a gas(es), nut coke, and activated carbon, the method comprising:
   a. pre-treating biomass using hydrothermal conversion, wherein the hydrothermal conversion is performed by heating the biomass in water at a temperature between about 230° C. and about 350° C. under a pressure of about 25 Bar to about 170 Bar; and
   b. applying electromagnetic energy to the pre-treated biomass to yield the one or more products.

6. The method as claimed in claim 5, wherein the biomass is heated during step (a) using microwave energy.

7. The method as claimed in claim 5, wherein the method yields a product selected from the group consisting of activated carbon, nut coke, and recarburiser carbon, and the method further comprises the step of using the product to manufacture steel.

8. A method of producing a bio-oil(s) from biomass the method comprising the steps of:
   a. pre-treating biomass by heating in water at a temperature of between about 230° C. and about 350° C. under pressure of about 25 Bar to about 165 Bar;
   b. providing an electromagnetic cavity that defines a reactor space for receiving the pre-treated biomass;
   c. delivering the pre-treated biomass into the reactor space so that the biomass travels in a first direction;
   d. applying electromagnetic energy to the reactor space and the pre-treated biomass received therein so that a bio-oil(s) is emitted from the pre-treated biomass in vapour form;
   e. supplying an inert carrier gas to the reactor space so that the inert gas travels in a direction opposite to the first direction to displace and carry the bio-oil(s) away from the reactor space; and
   f. collecting the bio-oil(s).

9. A method for processing biomass, the method comprising the steps of:
   a. pre-treating biomass by heating in water at a temperature of between about 230° C. and about 350° C. under pressure of about 25 Bar to about 165 Bar;
   b. providing an electromagnetic cavity, the electromagnetic cavity being adapted to enclose and contain a field of electromagnetic energy;
   c. introducing the pre-treated biomass to the electromagnetic cavity;
   d. applying electromagnetic energy to the electromagnetic cavity and the pre-treated biomass received therein at power levels such that the pre-treated biomass receives direct electromagnetic energy and an indirect black body radiation field is produced; and
   e. exposing the pre-treated biomass to the indirect black body radiation field while simultaneously applying the direct electromagnetic energy such that at least one of a bio-oil(s), activated carbon, nut coke, and recarburiser carbon is produced from the pre-treated biomass.

10. A method for processing biomass, the method comprising the steps of:
   a. pre-treating biomass by heating in water at a temperature of between about 230° C. and about 350° C. under pressure of about 25 Bar to about 165 Bar;
   b. providing a microwave absorbing material;
   c. providing an electromagnetic cavity, the electromagnetic cavity being adapted to enclose and contain a field of electromagnetic energy;
   d. providing a reaction container, the reaction container being adapted to enclose solids, liquids and gases;
   e. introducing the reaction container to the electromagnetic cavity;

f. introducing the pre-treated biomass to the reaction container;
g. introducing the microwave absorbing material to the reaction container;
h. introducing an added gas to the interior of the reaction container;
i. applying electromagnetic energy to the electromagnetic cavity, the reaction container and the microwave absorbing material received therein at a power level such that the microwave absorbing material receives direct electromagnetic energy;
j. allowing heat to flow from the microwave absorbing material to the added gas such that a plasma is produced by the added gas, the plasma providing a radiation field; and
k. exposing the pre-treated biomass to the radiation field such that at least one of bio-oils, activated carbon, nut coke, recarburiser carbon, and of graphitic carbon is produced from the pre-treated biomass.

* * * * *